United States Patent [19]

Izutani et al.

[11] Patent Number: 5,100,544

[45] Date of Patent: Mar. 31, 1992

[54] LIQUID SEPARATING APPARATUS

[75] Inventors: Naoaki Izutani, Takatsuki; Yuji Watanabe, Sakai; Takashi Yasuhara, Toyonaka; Kayoko Sugioka, Osaka, all of Japan

[73] Assignee: Daikin Industries, Ltd., Osaka, Japan

[21] Appl. No.: 417,713

[22] Filed: Sep. 29, 1989

[30] Foreign Application Priority Data

| Sep. 30, 1988 | [JP] | Japan | 63-248602 |
| Sep. 30, 1988 | [JP] | Japan | 63-248603 |
| Sep. 30, 1988 | [JP] | Japan | 63-248604 |
| Sep. 30, 1988 | [JP] | Japan | 63-248605 |
| Sep. 30, 1988 | [JP] | Japan | 63-248608 |

[51] Int. Cl.⁵ ............................................. B01D 61/36
[52] U.S. Cl. ................................. 210/175; 210/321.6; 210/640
[58] Field of Search ............. 210/640, 259, 181, 184, 210/185, 186, 321.6, 175

[56] References Cited

U.S. PATENT DOCUMENTS 3,385,769  5/1968  Brose .......................... 210/640 X
3,774,763  11/1973  Yau et al. ..................... 210/259 X

FOREIGN PATENT DOCUMENTS 0088315  9/1983  European Pat. Off. .
0164326  12/1985  European Pat. Off. .
0118760  9/1987  European Pat. Off. .
1529382  6/1967  France .
2352571  5/1977  France .
63-218713  9/1988  Japan .

Primary Examiner—Frank Spear

[57] ABSTRACT

The present invention is directed to a liquid separating apparatus comprising a primary chamber on the high pressure side to which the given mixed liquids containing the liquid to be separated and the other liquid are fed, and a secondary chamber on a low side which comes into contact with the primary chamber through the selective transmission separation membrane for liquid separating use, and heating pipes which heats the mixed liquids to be fed so as to raise the temperature thereof, and simultaneously, and interrupts the flow of the mixture liquids.

13 Claims, 23 Drawing Sheets

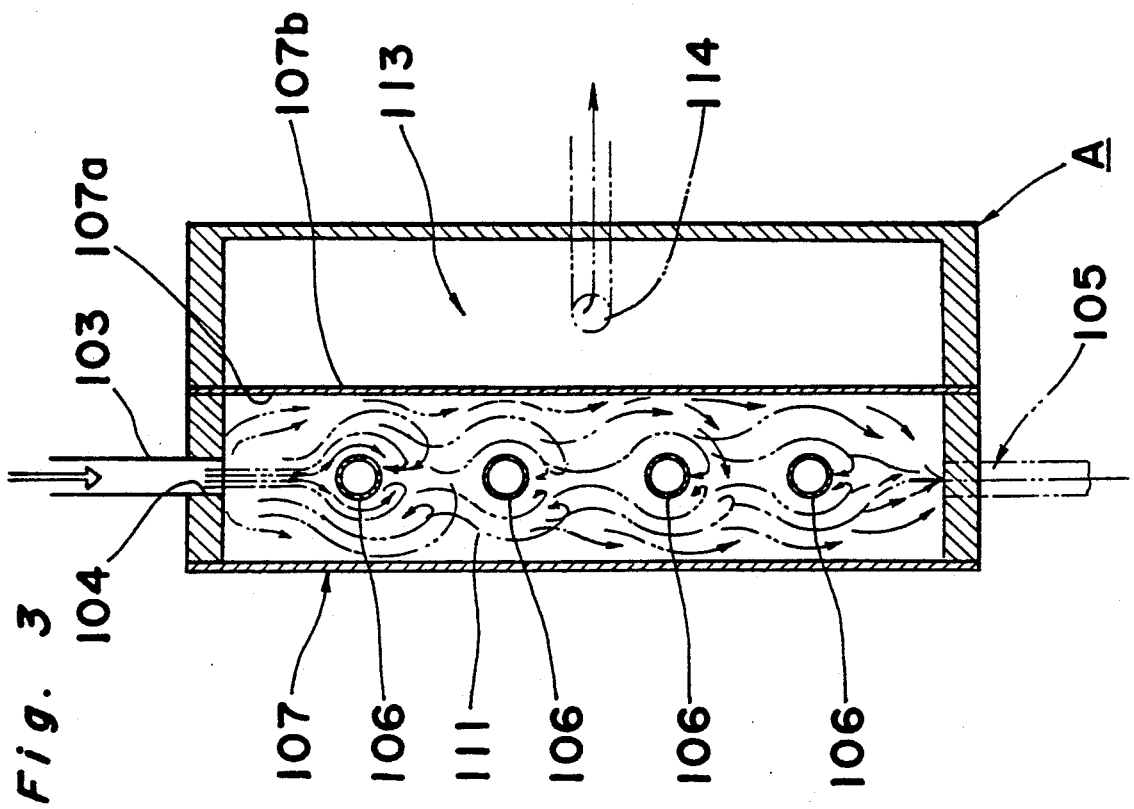
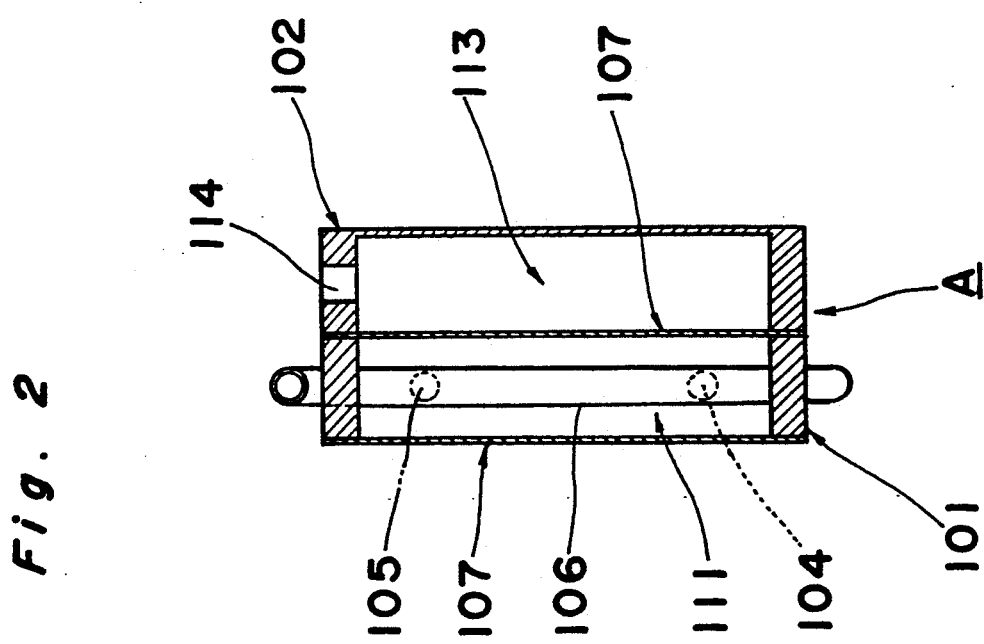

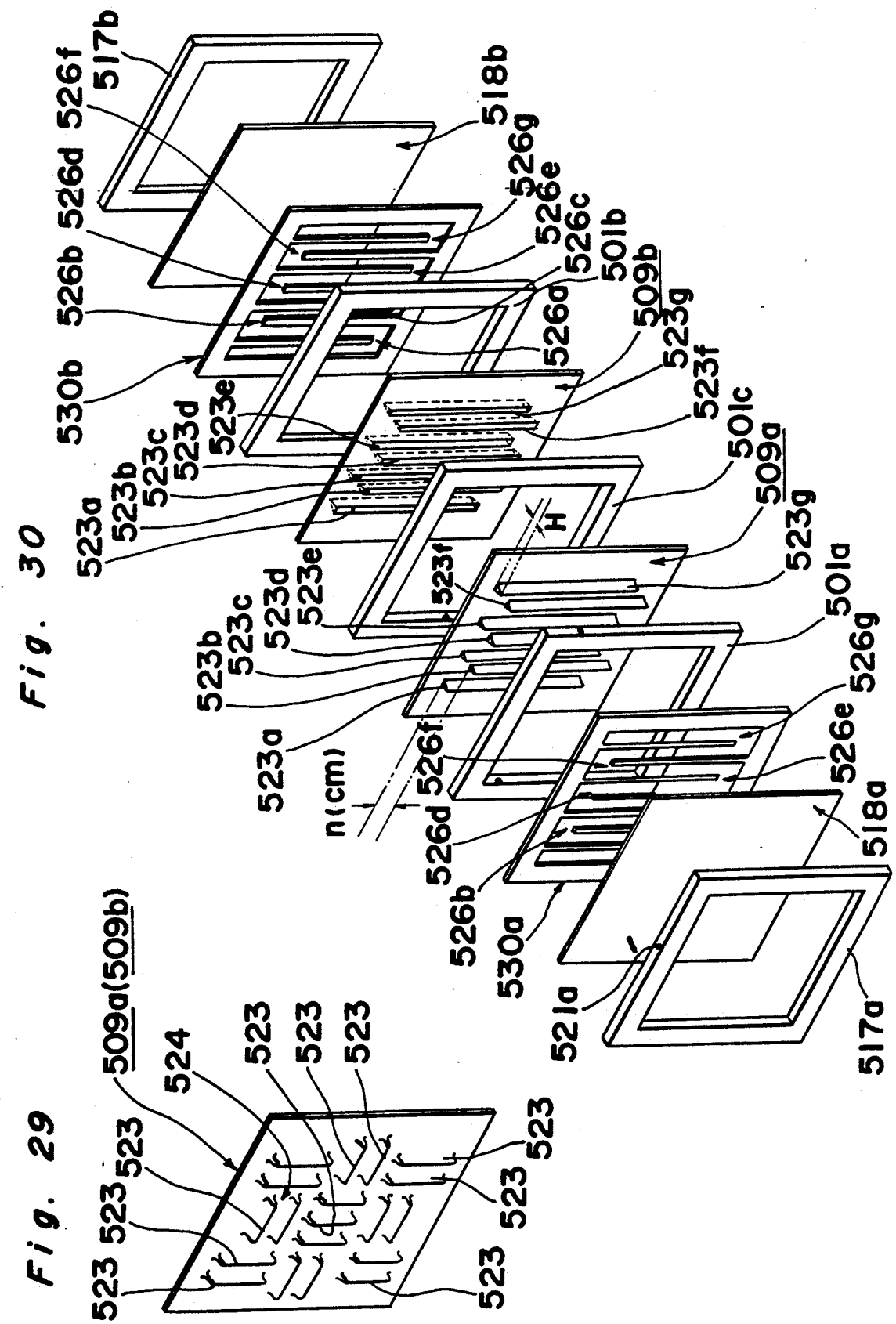

LIQUID SEPARATING APPARATUS

BACKGROUND OF THE INVENTION

The present invention generally relates to a liquid separating apparatus using a permeation evaporating method.

Generally, in the field of a chemical industry, so-called organic solvents such as alcohol and its kind, kent and its kind, either and its kind, ester and its kind, and so on are often used. All these organic solvents are likely to dissolve water, and are very dissolved in water in quality. Accordingly, they are likely to become generally mixed water even in the preserving condition so as to form an azeotropic mixture with respect to the water.

However, when the organic solvent is used in actual chemical reaction, the extremely high purity is demanded, with a strict limit being imposed upon the mixture of the water. Thus, in the actual use, a concentration system is generally adopted of increasing the purity through the separation of the water from the organic solvent as the prior treatment step.

Also, in a step of washing precision components such as semiconductors or the like, the product is washed with pure water, thereafter with, for example, isopropanol (namely, alcohol group washing liquid) so as to completely remove the moisture adhered in the former step. At this time, the isopropanol as the washing liquid is diluted by the repeated use thereof through the moisture of the former step. When the washing operation is effected by the use of the isopropanol diluted into the concentration of 90% or lower, the moisture remains on the product, which may cause defects in the portion thereof. Therefore, there is required a regenerating system which separates the water from the isopropanol diluted by the use in the precision washing operation so as to increase the purity for the reuse thereof.

Conventionally a distillation method was generally used as a method of separating the water (pure water) from the mixed liquid between such water as described hereinabove and organic solvent such as alcohol or the like so as to concentrate the organic solvent.

However, in the case of the distillation method, it is difficult to separate azeotropic mixture, approximate boiling point mixture of the like in terms of the principle thereof. As the mixture between the above-described water and alcohol (ethanol, isopropanol or the like) corresponds to the azeotropic mixture, the separating operation cannot be effected by the conventional general distillation method.

In such a case as described hereinabove, although a so-called azeotropic distillation method which makes it possible to effect an separating operation through the addition of the given tertiary component such as benzene, trichloroethylene or the like may be adopted, the method consumes an extreme large quantity of steam consumed in this method, with many problems that the separation liquid is polluted by the tertiary component mixture, the apparatus is complicated, and so on.

Among the especially active researches, developments in recent years with such circumstances being backgrounds, there is a separation (dehydration) system for water/organic liquid mixture by a liquid separation method using, for example, moisture selective transmission membranes (for example, as disclosed in Japanese Patent Application No. 62-35401).

In the liquid mixture separating system, a primary chamber and a secondary chamber are partitioned, in the primary chamber a separating operation is effected by a moisture selective transmission membrane composed of a non-porous amorphous high molecular membrane, with the object mixed liquids containing the water being fed into the primary chamber, in the secondary chamber the transmitted separation component of an object is condensed and stored. The secondary chamber side is pressure-reduced into a vacuum condition by a pressure reducing means such as a vacuum pump or the like so as to form a partial pressure difference of the given value or more between the primary chamber side boundary face of the water selective transmission membrane and the secondary chamber side boundary face. The water molecule ($H_2O$) only transmitted through each step of adsorption→resolution→diffusion→disconnection is adapted to go out in a gaseous condition onto the side of the secondary chamber on the low pressure from the high pressure (the primary chamber side) in accordance with the partial pressure difference and the concentration difference of the selection component between the primary side of the secondary side.

Accordingly, according to the mixed liquid separating system of such a construction as described hereinabove, not only the approximate boiling point mixed liquids, but also such azeotropic mixed liquids such as the above-described water and alcohol may be separated, concentrated without any questions. Furthermore, as the tertiary component as in the azeotropic distillation method is not used at all, with an advantage that the operation is clean, and the apparatus is also compact.

In the actual system, the construction through the combination between the primary chamber and the secondary chamber as described hereinabove uses modules as a single unit, and a plurality of pair combinations with them are often used as plant.

As the permeation evaporating operation in the liquid separating apparatus is a separating operation substantially accompanying a phase variation (liquid phase→gas phase) as clear from the above-described explanation, the temperature of the feed liquid around the permeation membrane is gradually lowered due to the evaporation latent heat of the transmission material as the separating condition is advanced. And the transmission speed in the transmission membrane portion has an exponential function relation with respect to the temperature of the feed liquid, and is higher as the molecular activity becomes active with the temperature being higher. Accordingly, when the temperature of the feed liquid is lowered as described hereinabove, the transmission speed of the object liquid is lowered to deteriorate the separation efficiency, which has been an important technical solution task.

In a certain quarter, for example, an independent heat exchanger for heating use is established on the way to the external passage of the module with respect to such technical task, and the mixed liquid lowered in the temperature is fed into the separation module of the next stage, while the mixed liquid is being heated. In such a method, considerable temperature difference of the mixed liquids is caused between on the entrance side within the separation module and the output side thereof, thus failing in the sufficient solution of the problem.

On the other hand, as the liquid separating system by the liquid separating method using the selective transmission membrane is adapted to efficiently transmit only the selection component which becomes an object in the selective transmission membrane portion, a so-called concentration boundary membrane (concentration boundary layer) is formed, because the selection molecules which become separation objects become short in the mixed liquids near the selective molecule adsorption face of the transmission membrane as the flow of the mixed liquids on the primary chamber side is slow, so that the necessary concentration difference may not be retained, with a problem that the transmission speed, and transmission efficiency are deteriorated even by it or as in the case of the above-described temperature.

In the liquid separating method using the selective transmission membrane, the concentrating operation of the mixed liquids may be effected. But it is difficult to remove the dirt of the isopropanol in a case where the diluted isopropanol used as, for example, precision washing liquid is concentrated and is used again, with a problem that it is improper in the reuse of the washing liquid.

SUMMARY OF THE INVENTION

Accordingly, an object of the present invention is to provide a liquid separating apparatus, wherein the liquid separation from a mixed liquid may be effected efficiently, and the dirt from the concentrated liquid may be efficiency removed.

Another important object of the present invention is to provide a liquid separating apparatus, wherein the mixture dilution of feed liquid within a primary chamber is prevented, the temperature reduction in the temperature reduction of the feed liquid within the primary chamber is prevented, furthermore the concentration boundary membrane near the primary chamber side surface of the selective transmission membrane may be prevented from being grown.

Still another object of the present invention is to provide a liquid separating apparatus, wherein the low concentration liquid on the entrance side within the primary chamber does not mix, dilute the high concentration liquid on the exit side so as to prevent the separating performance from being lowered.

For the solution of the conventional problems, the present invention is to provide, a liquid separating apparatus comprising a primary chamber on a high pressure side to which the given mixed liquids containing a liquid to be separated and the other liquid are fed, a secondary chamber on a low pressure side which comes into contact against the primary chamber through a selective transmission separation membrane for selectively transmitting the liquid to be separated, and a means for heating the mixed liquids flowing in the primary chamber from an inlet to an outlet of the primary chamber, thereby to present the mixed liquids from underheating by means of the vaporization latent heat.

According to one preferred embodiment of the invention, in a liquid separating apparatus provided with a primary chamber on the high pressure side to which the given mixed liquids containing liquid to be separated and the other liquid are fed, and a secondary chamber on the low pressure side which comes into contact against the primary chamber through the selective transmission separating membrane for separating the liquid, the heating pipes which heat the mixed liquids to be fed so as to raise the temperature thereof and simultaneously, interrupt the flow of the mixed liquids are disposed within the primary chamber on the high pressure side. The temperature reduction amount by the evaporation latent heat to be caused through the progress of the transmission separating action of the selection molecule may be sufficiently compensated by a temperature raising operation through the heating by a plurality of heating pipes, and the stable transmission speed as desired may be retained, with a superior effect that the transmission efficiency may be improved. Also, the plurality of heating pipes result in the effective formation of the turbulent flow in the mixed liquids to be fed, with a superior effect that the concentration boundary membrane to be caused near the adsorption face of the selective transmission separating membrane may be effectively reduced, and the transmission efficiency may be improved even from this point.

Also, in the liquid separating apparatus of the invention, many fin members are provided on the outer peripheries of the heating pipes, the fin members retain a wide contact area to come into contact against the feed mixed liquids within the primary chamber on the high pressure side, so that the heat capacity from the thermal source medium passing through the heating pipes may be transmitted into the mixed liquids with more efficiency. Also, simultaneously with it, when many fin members are provided as described hereinabove, so that the stirring force of the mixed liquids becomes larger than in a case of a single pipe only so as to increase a concentration boundary membrane removing function.

In addition, in the liquid separating apparatus of the invention, a filter unit for filtering the concentrated liquid to be guided from the primary chamber is additionally provided on the exit side of the primary chamber, the dirt of the concentrated liquid to be guided from the primary chamber is filtered by the filter unit, the concentrated liquid containing no impurites is obtained, with a superior effect that it is optimum to be applied to a system for condensing the washing liquid to be circulated, regenerated.

According to another embodiment of the invention, the interior of the primary chamber is partitioned by a plurality of partition walls to form a series of flow passages 8 continuous towards the exit side from the entrance side, and also, heating pipes for heating the feed mixed liquid are disposed within the flow passages, so that within the primary chamber, the feed mixed liquids are circulated in the even flow towards the exit side from the entrance side along the flow passage. The mixed dilution between the mixed liquids of low concentration closer onto the entrance side and the mixed liquids of high concentration closer onto the exit side is not caused, and also, the temperature reduction of the feed liquids by the evaporation latent heat accompanied through the evaporation of the selection transmission component to be contained in the feed liquid is prevented. Furthermore, the flow of the feed liquid is promoted by the arrangement of the heating pipe into the flow passage so that the growth of the concentration boundary membrane near the surface on the feed liquid of the selective transmission membrane is prevented effectively. Accordingly, considerable improvement in the separation performance is to be effected. Also, when many heating fins are formed on the outer peripheries of the heating pipe as in the liquid separating apparatus, the feed liquid heating operation and the concentration boundary membrane growth preventing operation to be provided by the liquid separating apparatus is more promoted by the increase in the heating area and the turbulence promotion of the feed liquid. Furthermore, when the difference between the high pressure and the low pressure is not so big as described at the start of the apparatus, at the stop thereof or the like, the selective transmission membranes may be oscillated by the flowing of the feed liquid, but it is to act as a spacer for preventing the contact between the adjacent selective transmission membranes by the forming of the partition walls.

According to still another embodiment of the invention, in the liquid separating apparatus, the interior of the primary chamber is partitioned by a plurality of partition walls so as to form a series of flow passages continuous towards the exit side from the entrance side between these partition walls. In the interior of the primary chamber, the feed liquid (namely, mixed liquid) is circulated in the even flow towards the exit side from the entrance side along the flow passage, so that the mixed dilution between the mixed liquids of the low concentration closer to the entrance side and the mixed liquids of the high concentration closer to the exit side is caused no more. Accordingly, the considerable improvement in the separation performance is improved. Also, when the flow passages are to be partitioned by the partition walls projected from the inner walls of the primary chamber, the mixed dilution preventing operation is obtained and also, these partition walls are to act as spacers away between the selective transmission walls.

According to further another embodiment of the present invention, in a liquid separating apparatus of the invention, the warm water circulation chamber is provided adjacent to the secondary chambers on the low pressure side, and the primary chambers to be partitioned on the high pressure side for feeding the mixed liquids through the selective transmission membranes so as to feed the warm water for heating the mixed liquids and also, the warm water circulation chamber and the primary chambers on the high pressure side to which the mixed liquids are fed are partitioned through the heating plates. Thus, the mixed liquids within the primary chambers on the high pressure side are adapted to be heated equally and efficiently across the whole from the entrance side thereof to the exit side thereof through the heating plates with the heat of the warm water flowing through the warm water circulation chamber. As a result, the temperature of the mixed liquids through the evaporation within the primary chambers on the high pressure side is adapted to be prevented from being lowered, so that the desired selection liquid transmission speed, the transmission efficiency may be retained. Also, as in the construction of the liquid separating apparatus of the invention, a plurality of projected portions are adapted to be formed on the primary chamber on the high pressure side of the heating plates of the liquid separating apparatus of the invention, the projected portions achieve the operation of enlarging the heating area on the radiation side of the heating plates to improve the heating effect of the mixed liquids, and simultaneously, the stirring operation of the mixed liquids flowing through the primary chamber on the high pressure side to form the turbulence so as to remove the concentration boundary membrane to be caused near the transmission membrane by the turbulence.

Furthermore, many fins are provided on the plurality of projected portions of the heating plates so that the heating efficiency becomes considerably higher and also, becomes higher in the turbulence forming effect by the fins.

According to still further embodiment of the invention, in a liquid separating apparatus a warm water circulation chamber is set adjacent to the secondary chambers on the low pressure side and the primary chambers to be partitioned on the high pressure side for feeding the mixed liquids through the selective transmission membranes with the warm water for heating the mixed liquids being adapted to be fed. Also, the warm water circulating chamber and the primary chambers on the high pressure side to which the mixed liquids are fed are made of metallic plate which is be press-moldable, and are partitioned through the heating plates which are provided with a plurality of fins of an optional shape and an optional height through the press-molding operation provided on the primary chamber face on the high pressure side. Thus, the mixed liquids within the primary chambers on the high pressure side are adapted to be heated uniformly and with extreme efficiency through the whole onto the exit side from the entrance side thereof by the heat of the warm water flowing through the warm water circulation chamber through the heating plates provided with the fins portions. As a result, the temperature fall of the mixed liquids through the evaporation latent heat within the primary chambers on the high pressure side is adapted to be positively prevented, so that the desired selection liquid transmission speed, and the transmission efficiency originally set are adapted to be retained. Also, a plurality of fins formed by the press molding on the primary chamber face on the high pressure side of the heating plates achieve the action of enlarging the heating area on the radiation side of the heating plates to improve the heating effect of the mixed liquids as described hereinabove and simultaneously, furthermore achieve the stirring operation of the mixed liquids flowing through the primary chamber on the high pressure side to form the turbulence within the primary chambers on the high pressure side so as to effectively remove the concentration boundary membrane to be caused near the transmission membrane by the turbulence. The heating plates are formed of the press-moldable metallic plates, and the fins are swollen, formed in an optional shape and an optional projected height within the primary chambers on the high pressure side from the side of the warm water circulation chamber side by the press molding. Thus, the fins themselves are easily formed, and also, the warm water is turned around onto the the inner sides of the fins. The heating efficiency becomes much higher, and also, the complicated turbulence is easier to form, thus increasing the turbulence forming effect.

According to the other embodiment of the invention, in a liquid separating apparatus, a warm water circulation chamber is disposed adjacent to the secondary chambers on the low pressure side, and the first primary chambers to be partitioned on the high pressure side for feeding the mixed liquids through the selective transmission members, with the warm water for heating the mixed liquids being adapted to be fed, the warm water circulation chamber, and the primary chambers on the high pressure side to which the mixed liquids are fed are partitioned through the heating plates with the net members being fixedly spliced on the side faces of the primary chambers. The mixed liquids within the primary chambers on the high pressure side are heated equally throughout the whole from the entrance side thereof to the exit side and are heated with extremely good efficiency by the fin effect of the net members through the heating plates by the heat of the warm water flowing into the warm circulation chamber. As a result, the temperature fall of the mixed liquids through the evaporation latent heat within the primary chambers on the high pressure side is prevented, thus retaining the desired selection liquid transmission speed, the transmission efficiency. Also, the net members fixedly spliced on the primary chamber faces on the high pressure side of the heating plates achieve an action of improving the heating effect of the mixed liquids through the enlargement of the heating area on the radiation side of the heating plates plates as described hereinabove, and simultaneously, achieve an extremely effective stirring operation of the mixed liquids flowing through the primary chambers on the high pressure side to form the turbulence within the primary chambers on the high pressure side so as to achieve an action of removing the concentration boundary membrane to be caused near the selective transmission membranes by the turbulence.

BRIEF DESCRIPTION OF THE DRAWINGS

These and other objects and features of the present invention will become apparent from the following description taken in conjunction with the preferred embodiment thereof with reference to the accompanying drawings, in which;

FIG. 2 is a longitudinal sectional view of the liquid separating apparatus shown in FIG. 1;

FIG. 3 is an enlarged sectional view of the liquid portion apparatus shown in FIG. 1;

FIG. 29 is a perspective view of the heating plate portion for the liquid separating apparatus in the a modification of the embodiment 14 of the present invention;

FIG. 30 is a decomposed perspective view of a liquid separating apparatus another modification of the embodiment 14;

DETAILED DESCRIPTION OF THE INVENTION

Figure 1:
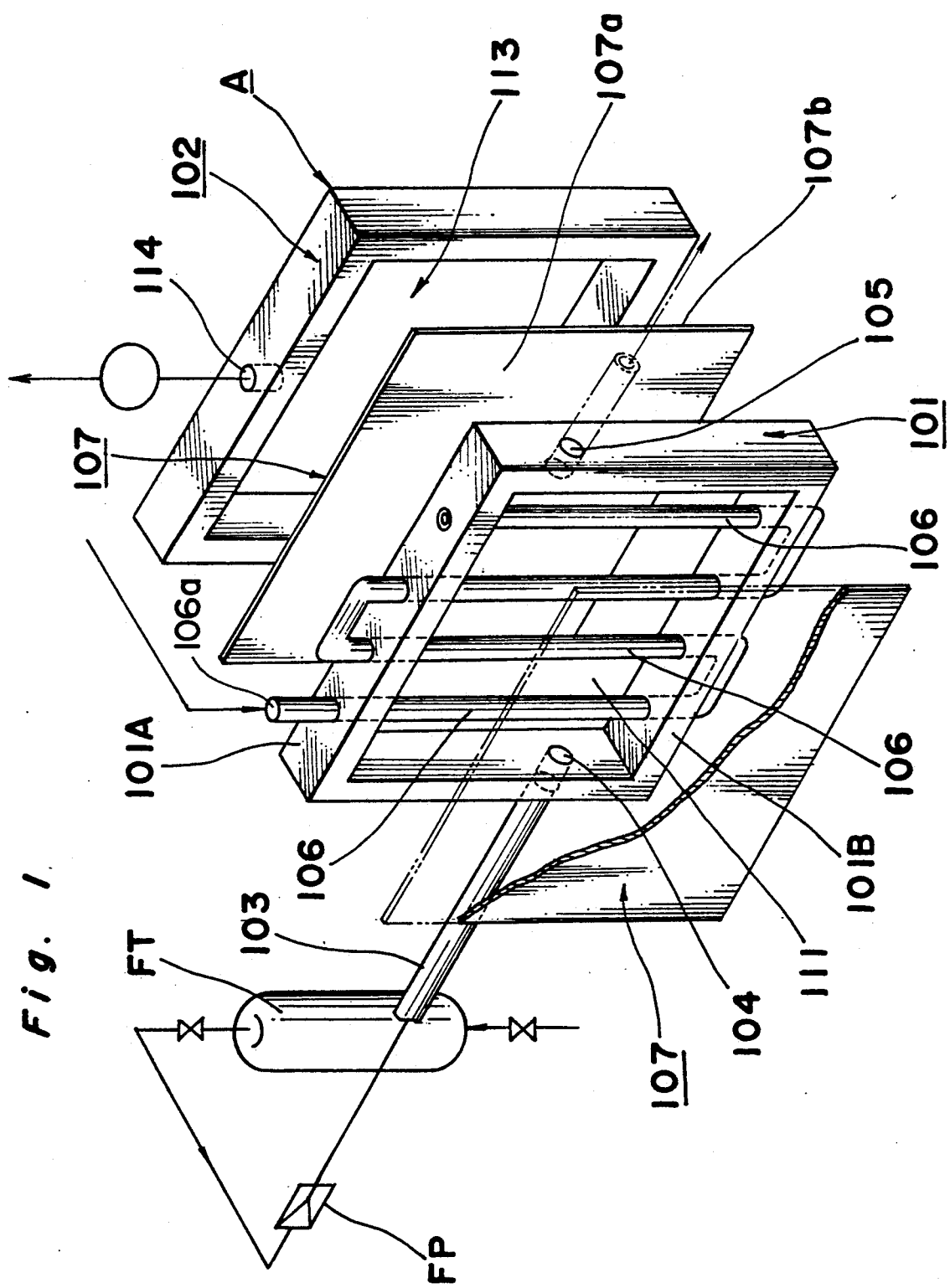
FIG. 1 is a dismantled perspective view of the major construction portions showing the module construction of a liquid separating apparatus in the embodiment 1 of the present invention.

Referring now to the drawings, there are shown some preferred embodiments of the present invention as liquid separating apparatuses.

EMBODIMENT 1

FIG. 1 and FIG. 2 show a liquid separating apparatus in the embodiment 1 of the present invention.

The liquid separating apparatus of the present embodiment is provided to separate the water ($H_2O$) from the alcohol aqueous solution to obtain the concentrated alcohol, and is a permeation evaporation module unit A of a plate and frame type.

In each drawing, reference character 101 is a first frame having a given width for forming the primary chamber 111 on the high pressure side for feeding the mixed liquids. A mixed liquid feed opening 104 which is communicated into a feed tank FT through a feed pipe 103 is provided under, for example, the front end portion in the first frame 101. Also, an exhaust opening 105 for exhausting the concentrated alcohol after the water ($H_2O$) which is a separation liquid as an object has been transmitted, removed is provided above the rear end side thereof.

Furthermore, reference characters 106, 106 ... are a plurality of heating pipes which are provided in parallel at given intervals in the longitudinal direction between the upper and lower frame members 101A, 101B of the first frame 101, and are connected with a U-shaped pipe on the outer end side so that they are continuously communicated with each other. One end side 106a thereof is adapted to be connected with, for example, a warm water feeding source as a thermal source, so that the warm water of the given temperature is adapted to flow in the arrow direction.

Reference character 107 is a selective transmission membrane or a selective transmission separation membrane composed of, for example, a water selective amorphous high molecular membrane (described later) which is mounted on the right, left opening face side of the first frame 101, and blockades the space within the frame (the primary chamber 111). The secondary frame 102 adjacent to the first frame 101 is integrated with the first frame 101 through the selective transmission separation membrane 107 on one side, so that the secondary chamber 113 on the pressure side for drawing out the moisture ($H_2O$) through the selective transmission separating membrane 107 is formed on the inner side thereof. The secondary chamber 113 is connected with a pressure reducing means not shown such as a vacuum pump or the like through a suction opening 114. The interior of the secondary chamber 113 is adapted to be reduced in pressure into an approximate vacuum condition by the operation of the pressure reducing means.

Accordingly, according to the liquid separating apparatus A of the construction of the embodiment, the mixed liquids of water ($H_2O$) and alcohol (for example, ethyl alcohol:$C_2H_5OH$) to be continuously fed are introduced into the primary chamber 111 from the mixed liquid feed opening 104 through, for example, the feed pump FP from the feed tank FT, and flows slowly into the primary chamber 111 for the given time in accordance with the feed thereof and the exhaust speed thereof.

In the condition, the side of the secondary chamber 113 is reduced in pressure into an approximate vacuum condition so as to realize the partial pressure difference more than the given value between the selection molecule adsorption face 107a of the selective transmission separating membrane 107 and the selection molecule disconnection face 107b on the secondary chamber side. The selective transmission separating membranes 107, 107 in the present embodiment as described hereinabove selectively transmit only the water ($H_2O$) component as the object. They are formed of a water transmission amorphous high molecular membrane (for example, as disclosed in the specification of Japanese Patent Application No. 62-35401) composed of, for example, "α-fluoro acrylate copolymer". The water component ($H_2O$ molecule) corresponding to the selection characteristics thereof is transmitted from the primary chamber 111 on the high pressure side into the secondary chamber 113 at the transmission speed proportional to the temperature of the mixed liquids themselves, and the concentration difference of the selection component ($H_2O$) between the primary chamber 111 side and the secondary chamber 113 side.

In this case, in the transmission of the water component ($H_2O$), the water molecule $H_2O$ in the mixed liquids within the primary chamber 111 on the high pressure side is absorbed on the absorption surfaces 107a of the selective transmission separation membrane 107 at first by the material (molecule) moving energies accompanied by the concentration difference of the selection molecule from the high pressure side onto the low pressure side. Thereafter, the water molecule $H_2O$ is melted, diffused in the separation membrane 107 by the molecule accompanied by the resolution action. The melted and diffused amount of the water molecule $H_2O$ at this time largely depends upon the temperature of the mixed liquids, and the partial pressure difference between both the boundary faces of the separation membranes 107, the concentration difference of the selection molecule $H_2O$, or the like. In this case, the partial pressure difference may be comparatively easily controlled into an ideal value by the constant control of the feed pressure through the feed pump FP on the mixed liquid feed side, and also, by the constant control of the reduced pressure value through the pressure reducing means.

But the temperature of the mixed liquids on the side of the primary chamber 111 on the high pressure side and the concentration difference of the selection component ($H_2O$ molecule) may not be easily maintained at a desired value, considering the following situation. Namely, as described hereinabove, the transmission action at the selective transmission membranes 107, 107 is a liquid separating one, and naturally accompanies the phase variation (liquid phase→gaseous phase) of the water component $H_2O$ which is a selection molecule. Thus, as the separation action is advanced, the evaporation latent heat amount is increased to lower the temperature on the mixed liquid side.

Figure 4:
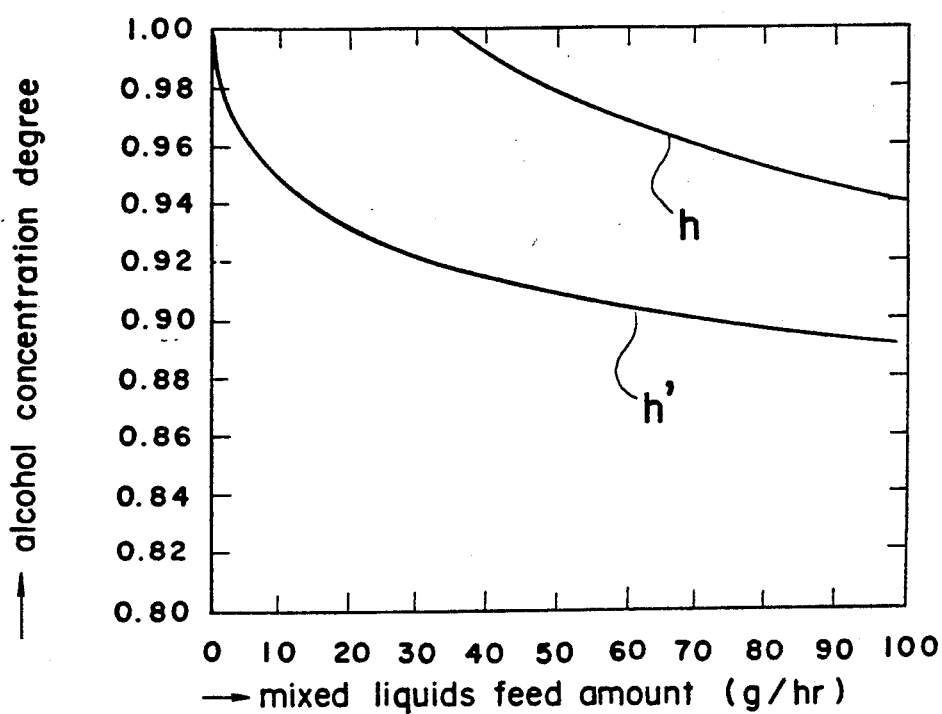
FIG. 4 is a characteristic chart showing the variation characteristics in the transmission efficiency through the temperature fall of the feed mixed liquids by the evaporation latent heat with the concentration density (dehydration density) of alcohol and the feed flow amount as parameters.

But, as described hereinabove, the transmission speed of the water molecule ($H_2O$) for transmitting through the selective transmission separating membranes 107, 107 becomes higher when the temperature of the mixed liquids is higher (under ideal conditions) as described from the alcohol concentration degree characteristics of FIG. 4, and is superior in transmission performance. Accordingly, in the construction of the present embodiment, the mixed liquids within the primary chamber 111 on the high pressure side are adapted to be equally heated, raised in temperature from the entrance side thereof onto the exit side thereof by a plurality of heating pipes 106, 106 . . . as described hereinabove with the warm water passing therethrough. Therefore, the temperature fall of the mixed liquids through the evaporation latent heat, especially the reduction in the transmission speed of the water molecule is compensated for (the ideal temperature conditions of FIG. 4 are maintained).

Figure 5:
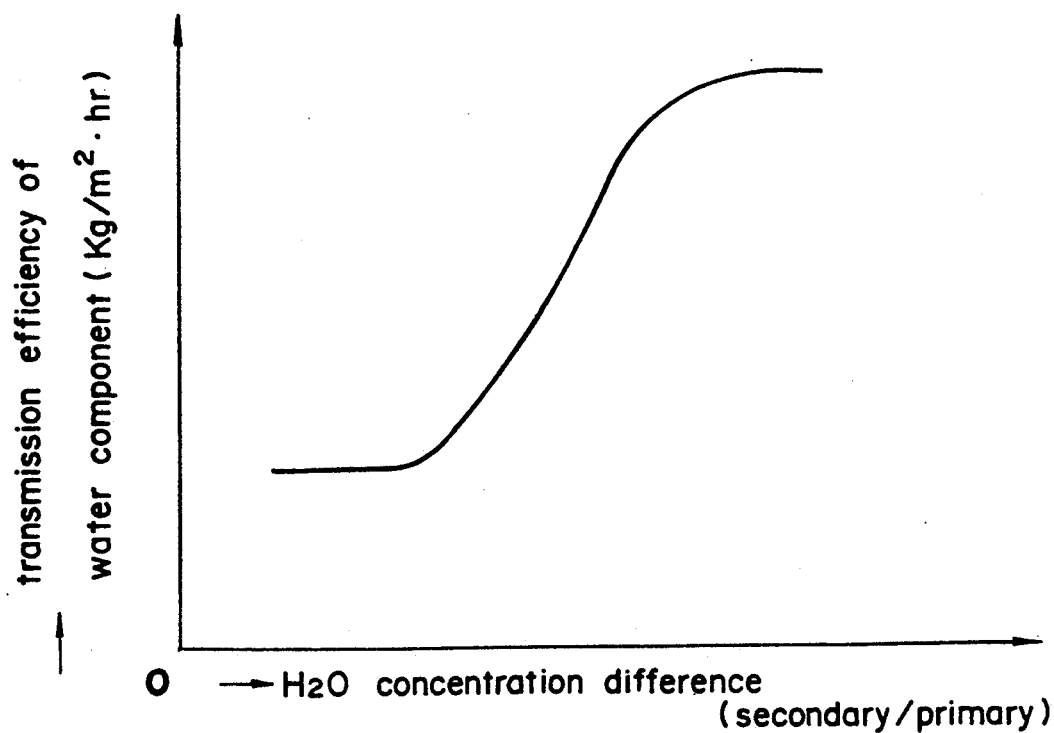
FIG. 5 is a characteristic chart showing the relation between the concentration difference of the water molecule component among the separating membrane boundary faces, and the water component transmission amount.

As the selective transmission separating membranes 107, 107 are constructed as water selective ones as described already, a continuous layer with the water molecule $H_2O$ component being short is formed inevitably on the side of the adsorption face 107a by the continuous transmission of the water molecule $H_2O$. This is generally called concentration boundary membrane, with a problem that the concentration difference is largely reduced if it is formed to deteriorate the transmission speed, the transmission efficiency of the water component (see FIG. 5).

But, as described hereinabove, in the present embodiment, a plurality of heating pipes 106, 106 . . . are vertically extended as described at the given intervals from the side of the mixed liquid feed opening 104 of the central portion within the primary chamber 111 onto the side of the exhaust opening 105, and are disposed orthogonal with respect to the direction along which the mixed liquids flow. Thus, as shown in FIG. 3, the liquid flowing from the side of the mixed liquid feed opening 104 onto the side of the concentrated liquid exhaust opening 105 is spread right and left, forming the turbulence sequentially in each of the heating pipes 106, 106 . . . portions, so that the above-described concentration boundary membrane is destroyed, removed by the stirring action. As a result, the concentration difference of the desired value may be maintained, thus realizing higher transmission speed and transmission efficiency of the water component even in terms of this point.

EMBODIMENT 2

Figure 6:
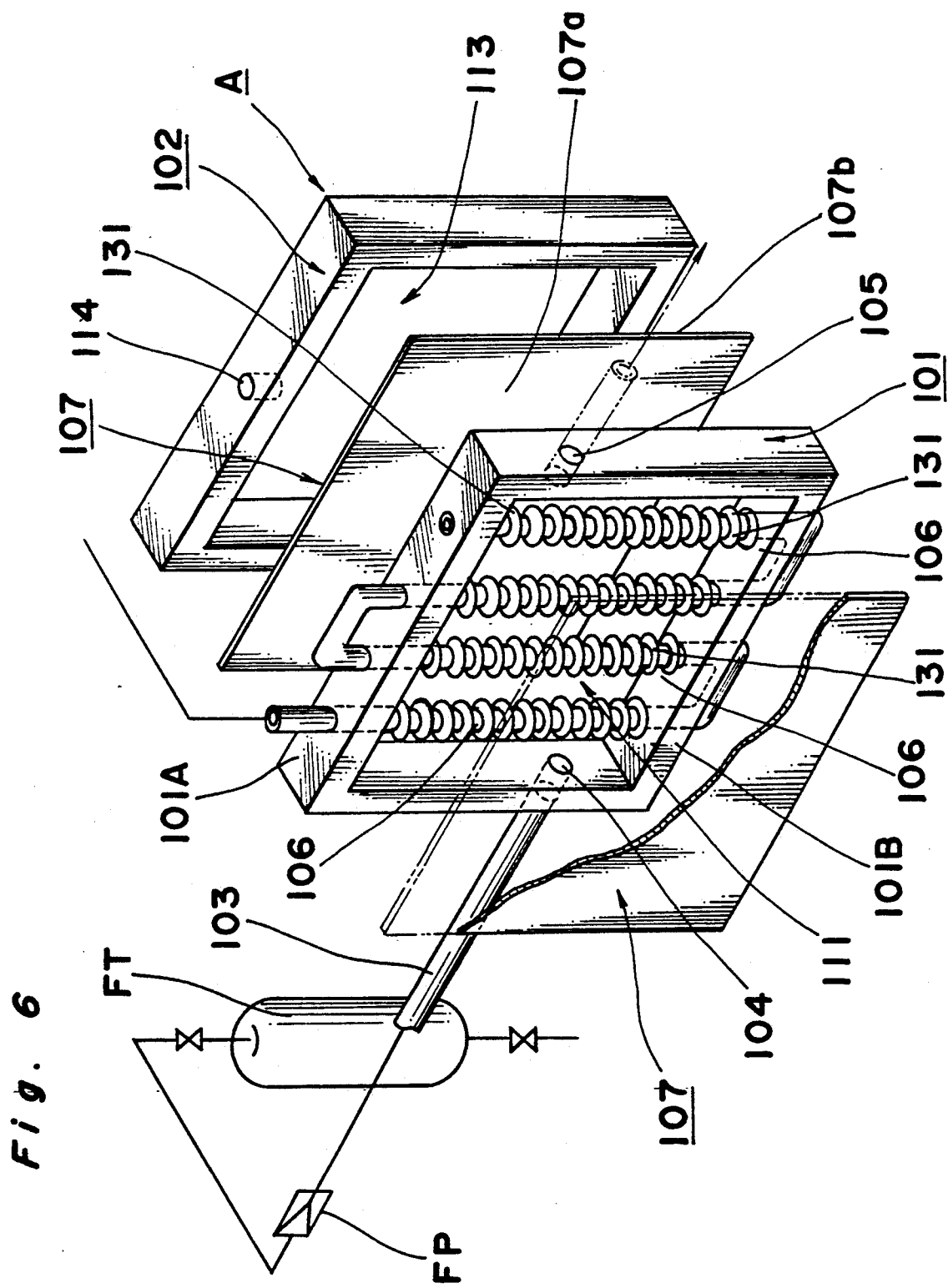
FIG. 6 is a view corresponding to FIG. 1 of the liquid separating apparatus in the embodiment 2 of the present invention.
Figure 7:
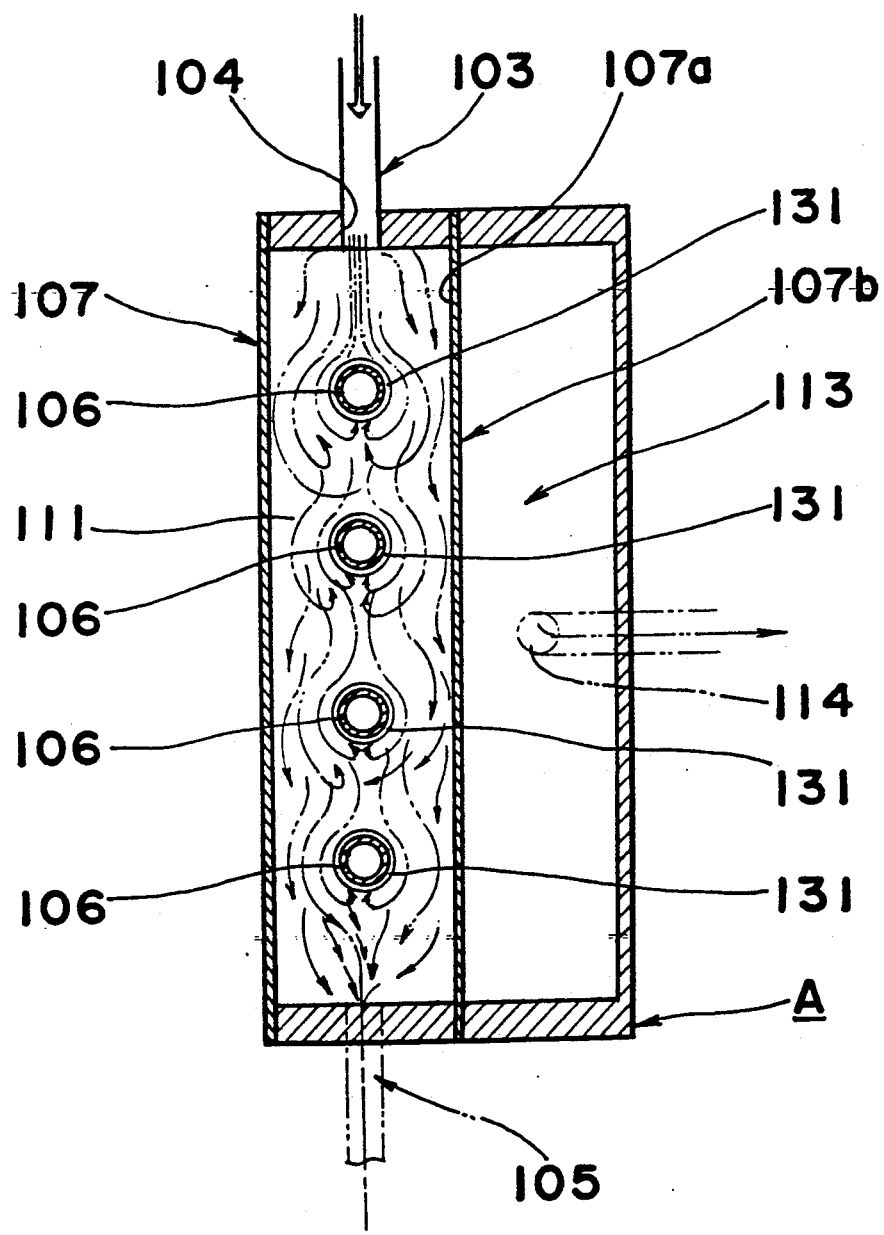
FIG. 7 is a sectional view corresponding to FIG. 3 of the liquid separating apparatus in the embodiment 2.

FIG. 6 and FIG. 7 show a liquid separating apparatus in the embodiment 2 of the present invention.

The present embodiment, as described in FIG. 6, is characterized in that many fin members 131, 131 are provided in parallel in the longitudinal direction on each outer peripheral face of a plurality of heating pipes 106, 106 . . . in the construction of the above-described embodiment 1, with the other construction being completely similar to the construction in the case of the embodiment 1.

In such a construction, as shown in FIG. 7, the mixed liquids flowing around the heating pipes 106, 106 . . . come into contact with the heating pipes 106, 106 by the wider contact areas so as to considerably improve the heating efficiency as compared with the construction of the embodiment 1.

Also, simultaneously with it, as the fin members 131, 131 . . . are adapted to stir the flow of the mixed liquids more effectively and complicatedly, the above-described concentration boundary membrane removing function is improved.

EMBODIMENT 3

Figure 8:
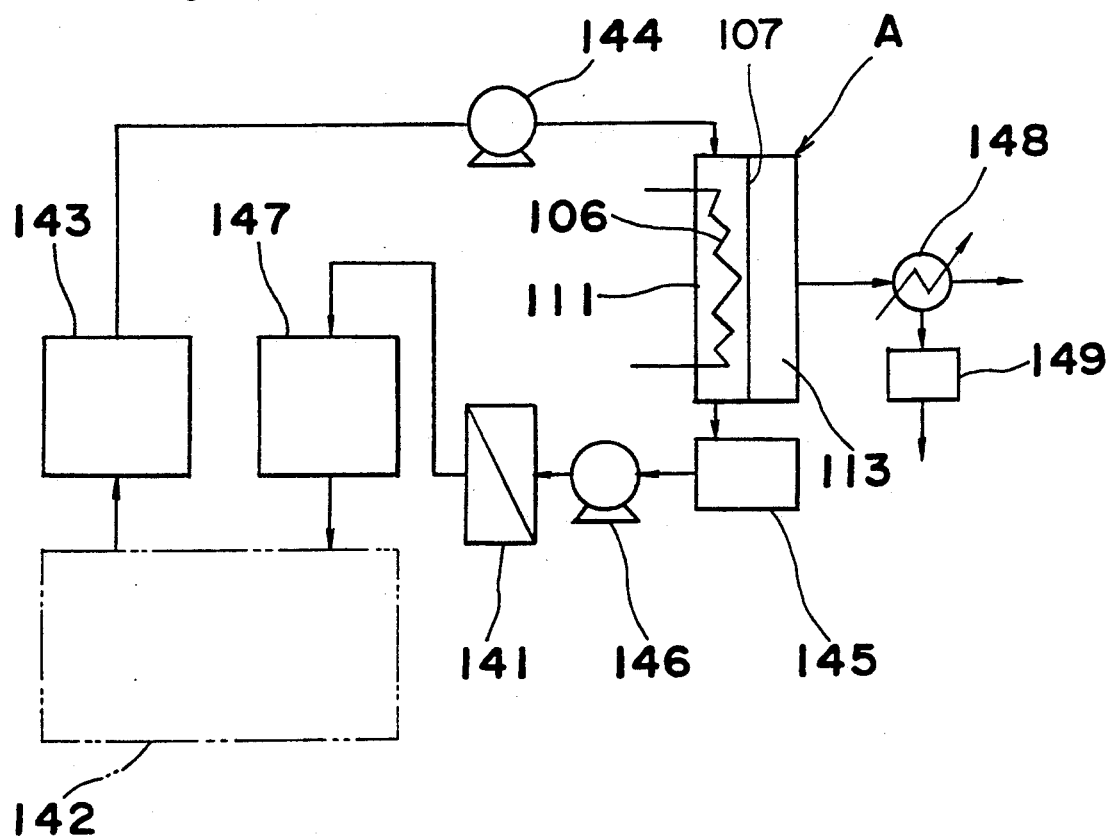
FIG. 8 is a block diagram showing a precise washing liquid regenerating system to which the liquid separating apparatus in the embodiment 3 of the present invention is applied.

Fig. 8 shows a precise washing liquid regenerating system to which the liquid separating apparatus in the embodiment 3 of the present invention is applied.

The liquid separating apparatus in the present embodiment is applied to a regenerating system for isopropanol to be used in the precise washing for semiconductors and so on with a permeation evaporation module unit A (which is illustrated in the above-described embodiments 1, 2) for separating, removing the moisture from the isopropanol to concentrate it, and a filter unit 141 for filtering the concentrated liquid to be guided from the permeation evaporation module unit A being provided as the major construction portion.

In the case of the present embodiment, a used washing liquid tank 143 wherein the used isopropanol to be flowed back from the precise washing machine 142 is stored, a used washing liquid feeding pump 144, a primary chamber 111 of the permeation evaporation module unit A, a buffer tank 145, a regenerated washing liquid feeding pump 146, a filter unit 141 and a regenerated washing liquid tank 147 are sequentially connected to constitute the precise washing liquid regenerating system. The reference character 148 is a condenser for condensing the moisture separated from the primary chamber 111 into the secondary chamber 113 in the permeation evaporation module unit A, and the reference character 149 is a condensed liquid tank.

The filter unit 141 is a precise filtration filter made of fluorine-resin macaroni yarn type or plane membrane type. The precise washing machine 142 is adapted to wash with isoporpanol the precise parts such as semiconductor and so on after they have been washed with pure water. The used washing water feeding pump 144 and the regenerated washing liquid feeding pump 146 are both an estimation type (for example, bellows pump) made of fluorine resin.

The operation of the precise washing liquid regenerating system shown in FIG. 8 will be described hereinafter.

In the precise washing machine 142, diluted isopropanol as the used washing liquid which is used in precise parts washing is fed into the primary chamber 111 of the permeation evaporation module unit A by the operation of the used washing liquid feeding pump 144 after it has been stored in the used washing liquid tank 143, and the water ($H_2O$) only is permeated, separated onto the side of the secondary chamber 113, and is concentrated by the action of the selective permeation separating membrane 107 disposed between the primary chamber 111 and the secondary chamber 113. The water which has transmitted through the selective transmission separating membrane 107 is concentrated by a condenser 148, thereafter is stored in the concentrated liquid tank 149, and is exhausted periodically. The isopropanol condensed in the permeation evaporation module unit A is once stored in the buffer tank 145, thereafter is fed under pressure into the filter unit 141 by the regenerating washing liquid feeding pump 146, wherein the dirt to by mixed in the precise washing machine 142, the pumps 144, 146, the permeation evaporation module unit A and so on is filtered and is provided as clean concentration isopropanol. The condensed isopropanol thus provided is fed into the precise washing machine 142 through the regeneration washing liquid tank 147 and is provided again for washing the precise parts.

EMBODIMENT 4

Figure 9:
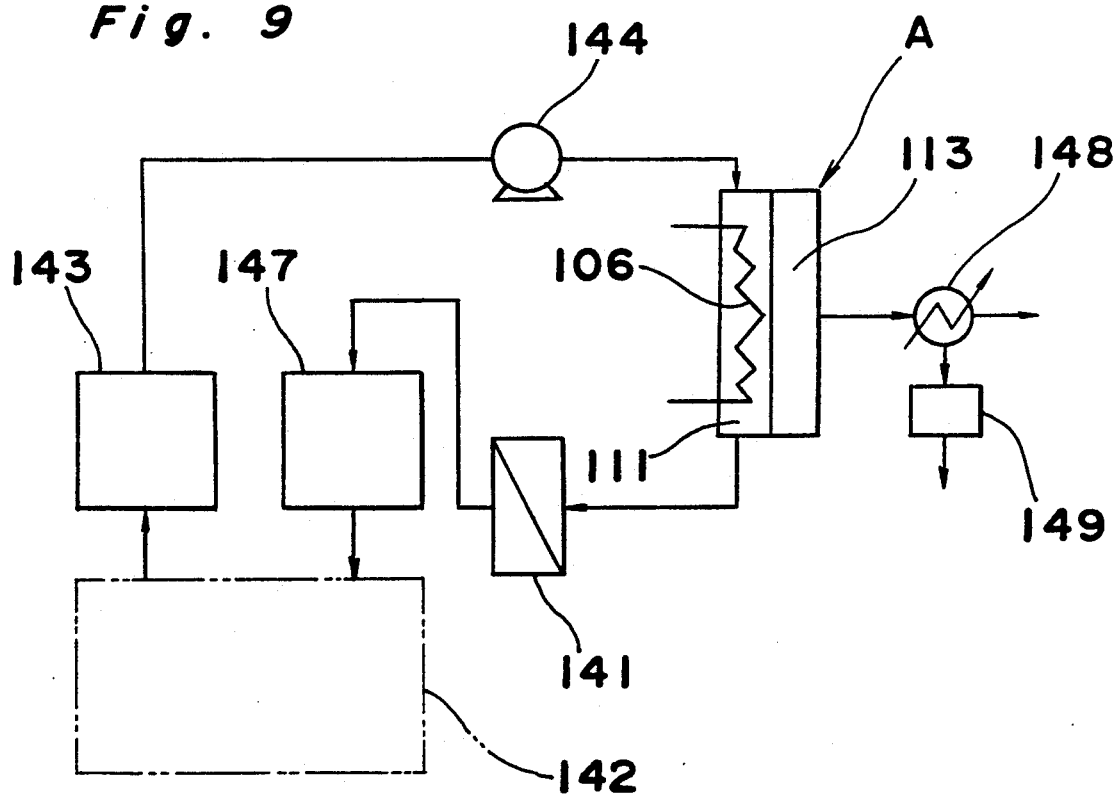
FIG. 9 is a block diagram showing the precise washing liquid regenerating system to which the liquid separating apparatus in the embodiment 4 of the present invention is applied.

FIG. 9 shows the precise washing liquid regenerating system to which the liquid separating apparatus in the embodiment 4 of the present invention has been applied.

In the case the present embodiment, the used washing liquid feeding pump 144 is adapted to be used as the regeneration washing liquid feeding pump, with the buffer tank 145 and the regenerating washing liquid feeding tank 146 on the exit side of the permeation evaporation module unit A being omitted from the precise washing liquid regenerating system shown in FIG. 8 and the regenerating washing liquid feeding tank 146. In this case, the discharge pressure of the pump 144 is set to a pressure exceeding the total sum of the pressure loss in the permeation evaporation module unit A and the pressure loss in the filter unit 141.

EMBODIMENT 5

Figure 10:
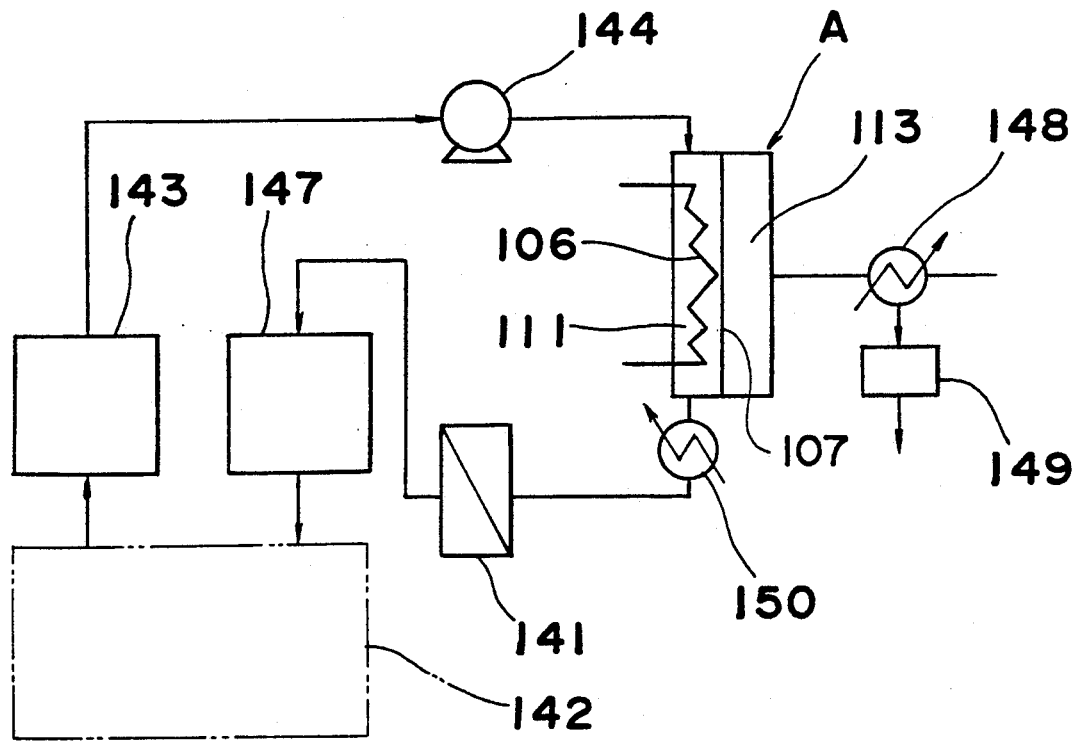
FIG. 10 is a block diagram showing the precise washing liquid regenerating system to which the liquid separating apparatus in the embodiment 5 of the present invention is applied.

FIG. 10 shows the precise washing liquid regenerating system to which the liquid separating apparatus in the embodiment 5 of the present invention is applied is shown.

In the case of the present embodiment, in the precise washing liquid regenerating system shown in FIG. 9, a heating exchanger 150 for cooling use which cools the condensed isopropanol to the normal temperature in the module unit A is additionally provided on the exit side of the permeation evaporation module unit A. In the case of the present embodiment, in the permeation evaporation module unit A, the isopropanol which has been concentrated and heated by the heating pipes 106, 106 . . . disposed within the primary chamber 111 is cooled down to the normal temperature by the heat exchanger 150 for cooling use so as to be fed into the filter unit 141.

EMBODIMENT 6

Figure 11:
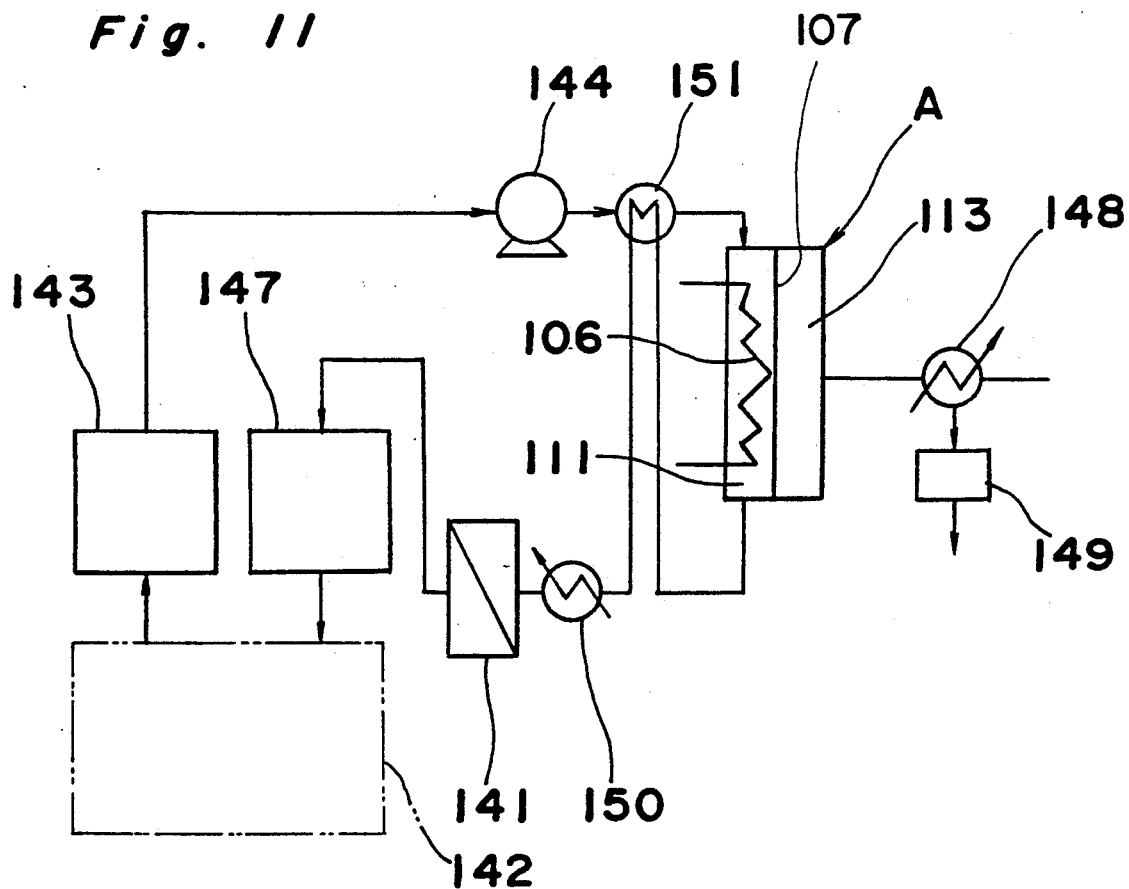
FIG. 11 is a block diagram showing a precise washing liquid regenerating system to which the liquid separating apparatus in the embodiment 6 of the present invention is applied.

FIG. 11 shows the precise washing liquid regenerating system to which the liquid separating apparatus in the embodiment 6 of the present invention has been applied.

In the case of the present embodiment, in the precise washing liquid regenerating system shown in FIG. 10, a heat exchanger 151 for heat recovery use which thermally exchanges the used isopropanol to be fed into the module unit A with the concentrated isopropanol to be guided from the module unit A, and recovers the heat the concentrated isopropanol retains as the preheating use of the used isopropanol. In the case of the present embodiment, the used isopropanol is preheated by the concentrated isopropanol, and also, the concentrated isopropanol cooled by the preheating operation is fed into the filter unit 141 after the temperature has been cooled to the normal temperature by the heat exchanger 150 for cooling use.

EMBODIMENT 7

Figure 12:
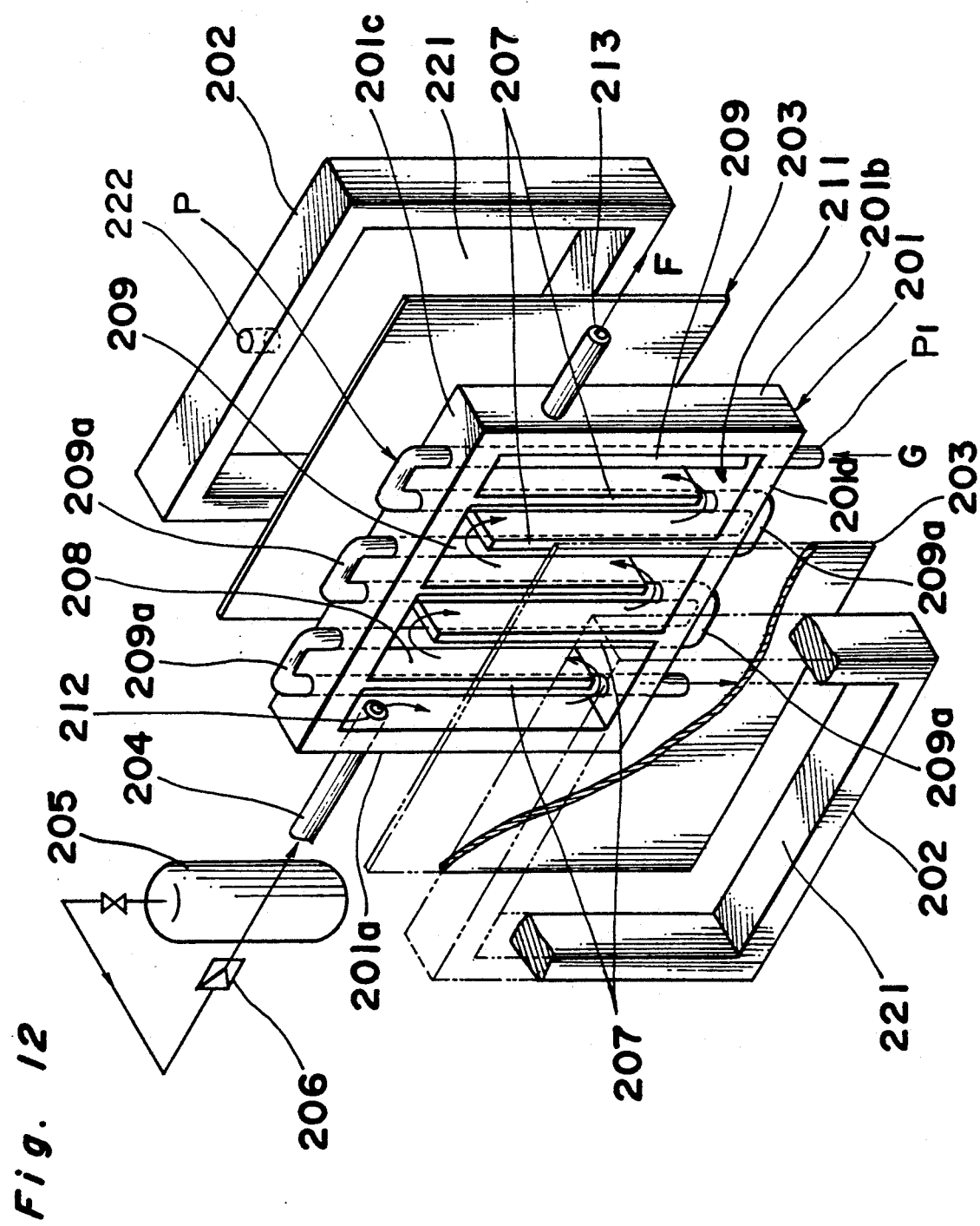
FIG. 12 is a decomposed perspective view showing the module construction of the liquid separating apparatus in the embodiment 7 of the present invention.
Figure 13:
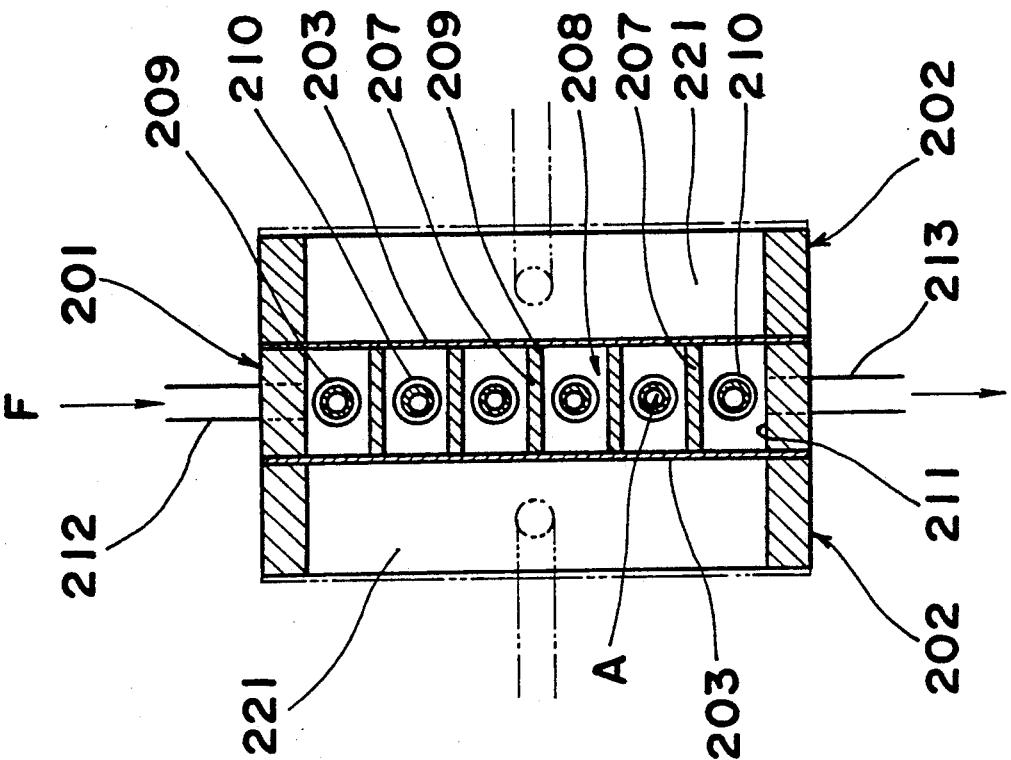
FIG. 13 is a lateral sectional view of the liquid separating apparatus shown in FIG. 12.

FIG. 12 and FIG. 13 show a liquid separating apparatus in the embodiment 7 of the present invention.

The liquid separating apparatus of the present embodiment is of a module construction of a plate and frame type, with the liquid separating apparatus shown showing a simple member of the module.

Also, the liquid separating apparatus of the present embodiment is used as an apparatus for concentrating the alcohol through the separation of the water ($H_2O$) which is the separating object component from the alcohol water solution by the permeation evaporation method, with the alcohol water solution diluted by the water being provided as an object mixed liquid.

The liquid separating apparatus (concretely a simple member module for separating the liquid) is composed of a first frame 201 for forming the primary chamber 211 on the high pressure side for feeding the mixed liquid (namely, alcohol water solution), second frames 202, 202 which are adjacently disposed on both the sides of the first frame 201, and form the secondary chambers 221, 221 on the low pressure side, selective transmission members 203, 203 disposed between the first frames 201 and the second frames 202, 202.

The first frame 201 is composed of rectangular frame member, with a mixed liquid feeding opening 212 which is communicated with the feed tank 205 through the feed pipe 204 being provided in the upper portion of the front frame 201a. The reference character 206 is a feed pump. Also, an exhaust opening 213 for exhausting the product alcohol, whose water ($H_2O$) as a separating object component is transmitted, removed and condensed is provided in the upper portion of the rear frame 201b of the first frame 201. A plurality of alternately adjacent partition walls 207, 207 . . . are projected from the inner faces of upper, lower frames 201c, 201d of the first frame 201, with the tip ends of these partitioned walls 207, 207 . . . being confronted in the positions away at given intervals from the inner faces of the mutually opposite frames 201c, 201d. A series of slender, folded flow passages 208 towards the exhaust opening 213 from the feed opening 212 are formed among the partitioned walls 207, 207 . . . . Namely, within the primary chamber 211 to be formed within the first frame 201, the mixed liquids are adapted to be circulated along the flow passage 208 as shown in an arrow towards the exhaust opening 213 from the feed opening 212, with a flow passage construction that a liquid for circulating onto the entrance side is not mixed with the liquid for circulating on the exit side.

Heating pipes 209, 209 . . . which extend through the central portion among the partitioned walls 207, 207 . . . are respectively disposed between the upper, lower frames 201c, 201d in the first frame 201. These heating pipes 209, 209 . . . are adapted to heat the feeding liquid into the given temperature, and are connected by U-shaped connecting pipe portions 209a, 209a . . . on the outer side of the first frame 201 for mutual communicating condition, and are adapted to constitute a series of heating pipe passage P. One end side P1 of the heating pipe passage P is connected with, for example, the warm water feeding source (not shown), so that the warm water of the given temperature is adapted to flow in an arrow G direction which becomes opposite in current with respect to the circulating direction of the feeding liquid in the flow passage 208.

Also, when the pressure difference between the primary chamber 211 and the secondary chamber 221 is not too much as in the start operation or the stop operation of the liquid separating apparatus, the selective transmission membranes 203, 203 on both the sides of the primary chamber 211 may be oscillated due to the circulation of the feeding liquid, but both the selective transmission membranes 203, 203 are prevented from coming into contact against each other by the existence of the partitioned walls 207, 207 . . . . Namely, these partitioned walls 207, 207 . . . serve as spacers for retaining the interval between both the selective transmission membranes 203, 203.

As the flowing passage 208 is effective if it is made as slender as possible, the number of the partitioned walls 207, 207 . . . to be formed is desired to be more in a range, wherein the inner pressure loss does not exceed the tolerance range, and the space for allowing the arrangement of the heating pipes 209, 209 . . . is retained. Also, the contact portion between each partitioned wall 207 and the selective transmission membrane 203 is desired to be made as thin as possible in the thickness of the partitioned wall 207, as the contact portion thereof becomes a portion where the membrane separating action can not be exhibited.

The second frame 202 is composed of the first frame 201 and a rectangular frame of the same shape. The secondary chamber 221 to be formed within it is partitioned from the primary chamber 211 within the first frame 201 by the selective transmission membrane 203. The secondary frame 202 has a suction opening 222 therein to be connected with a vacuum pump (not shown) which serves as a pressure reducing means for reducing the pressure within the secondary chamber 221 into an approximately vacuum condition.

The selective transmission membrane 203 is composed of an amorphous high molecular membrane having a quality through which only a particular component molecule (in the case of the present embodiment, water molecule) to be contained in the feed mixed liquids is selectively transmitted. The selective transmission membrane has an action of transmitting into the secondary chamber 221 the water molecule only from the feed liquid circulating through the primary chamber 211. For example, α- fluoro acrylic interpolymer or ethylene unsaturated compound (for example, styrene, vinyl, chloride, acrylonitrile, hydroxy ethyl acrylate, acrylic acid or the like) is copolymerized with the α- fluoro acrylic interpolymer to mold a membrane shape, and is used as the selective transmission membrane 203.

The operation of the shown liquid separating apparatus will be described hereinafter.

An alcohol water solution (namely, alcohol diluted with water) to be continuously fed into the mixed liquid feeding opening 212 through the feed pump 206 from the feed tank 205 flows slowly along the flow passage 208 formed within the primary chamber 211 in accordance with the feed thereof and the exhaust speed thereof.

The secondary chamber 221 is reduced in pressure so that the pressure may become an approximately vacuum condition by the operation of the pressure reducing means, simultaneously with the feeding of the alcohol water solution into the primary chamber 211. As a result, the pressure difference more than the given value is adapted to be realized between the primary chamber 211 side and the secondary chamber 221 side in the selective transmission membrane 302.

Figure 16:
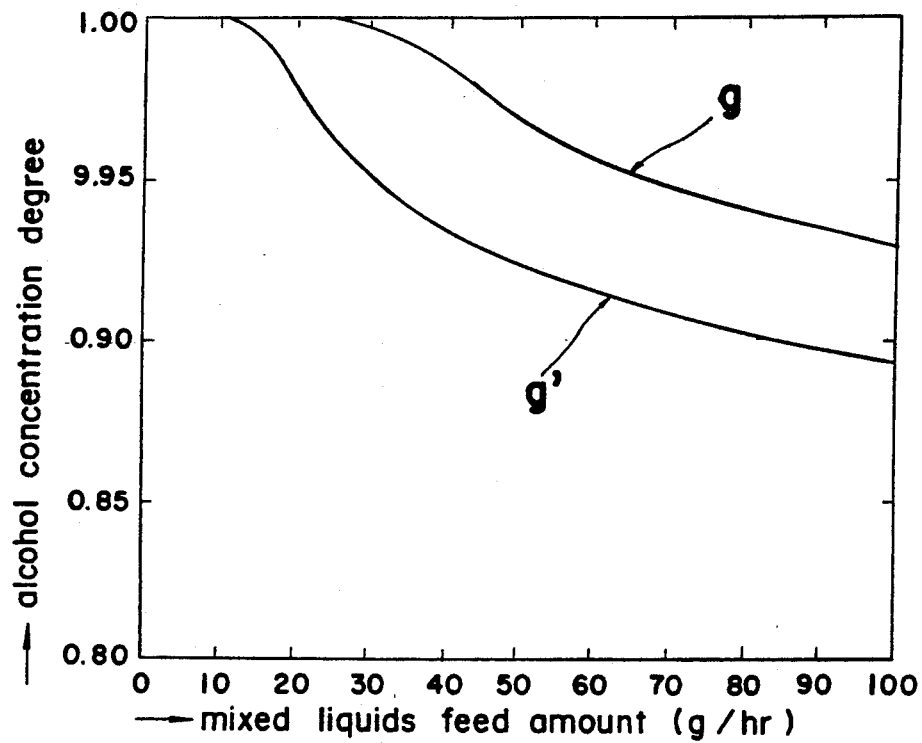
FIG. 16 is a characteristic chart showing the variation characteristics in the transmission efficiency through the existence, absence of the mixed dilution within the primary chamber in the relation between the flow amount of the mixed liquid (which is an alcohol aqueous solution) to be fed into the primary chamber and the concentration of a concentrated liquid (which is alcohol) on the exist side.

As described hereinabove, the selective transmission membrane 203 in the present embodiment is composed of an amorphous molecular membrane having characteristics which allow only the water molecule as the separating object component to be transmitted therethrough. The water molecule corresponding to the selective characteristics is transmitted from the primary chamber 211 to the secondary 221 at a transmission speed proportional to the partial pressure difference of the water molecule between the primary chamber 211 and the secondary chamber 221. Thus, the alcohol water solution flowing through the flow passage 208 is gradually condensed by the transmission separation of the water molecule from the primary chamber 211 to the secondary chamber 221 into the high concentration of alcohol and is exhausted from the exhaust opening 213. In this process, as the feed mixed liquids F are flowed along a slender flow passage 208 partitioned by the partitioned walls 207, 207 . . . , the lower concentration liquid near the entrance side (namely, feed opening 212) and the higher concentration liquid near the exit side (namely, the exhaust opening 213) do not effect the mixed dilution any more, the separation performance is considerably improved as compared with the case where the partitioned walls 207, 207 . . . are not formed. This description is clear from the characteristic graph showing the variation in the alcohol concentration in the primary chamber 211 exit with respect to the flow amount of the alcohol water solution shown in FIG. 16. Namely, the comparison between a characteristics curve g in a case (namely, under ideal conditions) where the mixed dilution between the low concentration liquid and the high concentration liquid is not effected within the primary chamber 211, and a characteristics curve g' in (namely, under the mixed conditions) where the mixed dilution between the low concentration liquid and the high concentration liquid is effected within the feed liquid chamber 211 shows that although the reduction in the separation performance of the module cannot be denied through the increase in the flow amount, the separation performance under the ideal conditions where the mixed dilution is not effected is considerably improved as compared with the separation performance under the mixed conditions where the mixed dilution is caused.

As the separation of the water molecule by the selective transmission membrane 203 depends upon the permeation evaporation accompanying the phase variation of the water molecule as the selection transmission component, the separation causes the temperature fall on the side of the feed liquid, because the evaporation latent heat amount is also increased as the separating action is advanced. In the case of the present embodiment, as the feed liquid flowing through the flow passage 208 is adapted to be heated through the heating action by the heating pipes 209, 209 . . . , the temperature fall of the feed liquid by the evaporation latent heat is compensated to prevent the transmission speed of the water molecule from being lowered. This description is clear from the characteristic graph showing the variation in the alcohol concentration in the exit of the primary chamber 211 with respect to the flow amount of the alcohol water solution shown in FIG. 4. Namely, the comparison between a characteristic curve h in a case (where the means for heating the feed liquid is taken) where the temperature fall of the feed liquid is adapted not to be effected within the primary chamber 211 and a characteristic curve h' in a case (namely, where a means for heating the feed liquid is not taken) where the temperature fall of the feed liquid is adapted to be effected within the primary chamber 211 shows that although the fall in the separating performance of the module cannot be denied through the increase in the flow amount, the separation performance under the ideal conditions where the temperature fall on the feed liquid is not caused is considerably improved as compared with the separating performance under the temperature fall conditions where the temperature fall of the feed liquid is caused.

The transmission of the water molecule in the case of the present embodiment is sequentially effected through the steps of melting into the selective transmission membrane 203 of the water molecule by the molecule movement through adsorption, resolution actions of the water molecule onto the surfaces of the selective transmission membrane 203 by the suction energies onto the low pressure side from the high pressure side, and diffusing onto the low pressure side of the water molecule in the selective transmission membrane 203, and disconnecting the water molecule from the low pressure side surface of the selective transmission membrane 203.

Although it is known that the transmission speed in the mechanism of such water molecule transmission as described hereinabove depends upon the various factors, there is, as an important factor for controlling the transmission speed, a partial pressure difference of separation object components (in the case of the present embodiment, water molecule) on the high pressure side and the low pressure side of the selective transmission membrane 203. It is a known fact that the partial pressure difference is determined by the concentration difference of the separation object components on the high pressure side and the low pressure side of the selective transmission membrane 203. When the selection transmission of the water molecule through the selective transmission membrane 203 is continuously effected, a layer (in other words, a layer high in alcohol concentration) wherein water molecule is short is produced on the primary chamber 211 side (namely, on high pressure side) of the selective transmission membrane 203. This is generally called concentration boundary membrane, the concentration difference between the separating object components (water molecule) on the high pressure side and the low pressure side of the selective transmission membrane 203 becomes extremely small by the production of the concentration boundary membrane, with a problem that the transmission speed of the water molecule is considerably lowered (see FIG. 5). The production of such concentration boundary membrane as described hereinabove is conspicuous in a case where the circulating fluid is in layer flow. The production of the concentration boundary membrane is prevented through the promotion of the turbulence of the circulating fluid. Accordingly, when the interior of the primary chamber 211 is partitioned by many partitioned walls 207, 207 . . and a series flow passages 208 towards the exhaust opening 213 from the side of the feed opening 212 have been formed as described in the present embodiment, the flow speed of the feed liquid circulating through the flow passages 208 becomes relatively faster as compared with a case where the feed liquid is circulated through the primary chamber 211 in a condition where the interior of the primary chamber 211 is not partitioned by the partitioned walls 207, 207 . . . . Thus, the turbulence is promoted by the increase in the flow speed near the surface on the side of the primary chamber 211 of the selective transmission membrane 203. The production of the concentration boundary membrane on the high pressure side (in other words, on the side of the primary chamber 211) of the selective transmission membrane 203 by the promotion of the turbulence is prevented, and the supply of the separation object component (water molecule) onto the high pressure side surface of the selective transmission membrane 203 is continuously effected. Accordingly, the concentration difference of the separation object component on the high pressure side and the low pressure side of the selective transmission membrane 203 may be maintained normally at the given value or more, so that the transmission speed and the transmission efficiency may be improved.

As described hereinabove, when the high, low pressure difference between the primary chamber 211 and the secondary chamber 221 is not too much as at the start of the apparatus, the stop thereof or the like, the selective transmission membranes 203, 203 on both the sides of the primary chamber 211 may be oscillated due to the circulation of the feed liquid, but the partitioned walls 207, 207 . . . serve as spacers for preventing the contact of both the selective transmission membranes 203, 203, thus greatly contributing towards the improvement in the durability of the selective transmission membranes 203, 203.

EMBODIMENT 8

Figure 15:
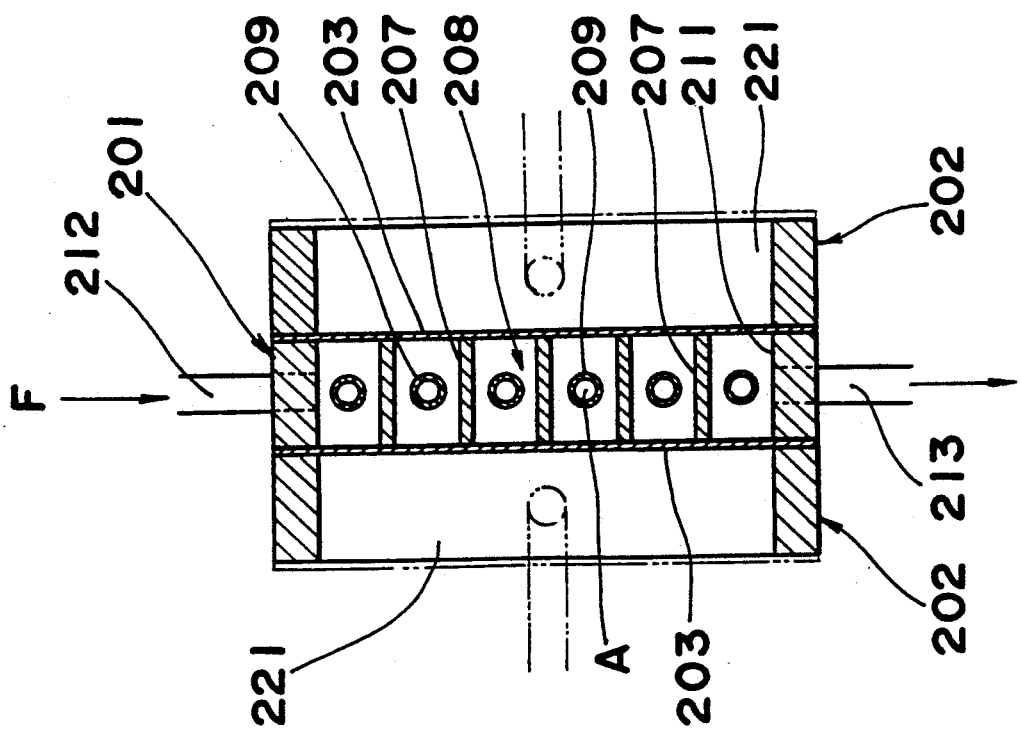
FIG. 15 is a lateral sectional view of the liquid separating apparatus shown in FIG. 14.
Figure 14:
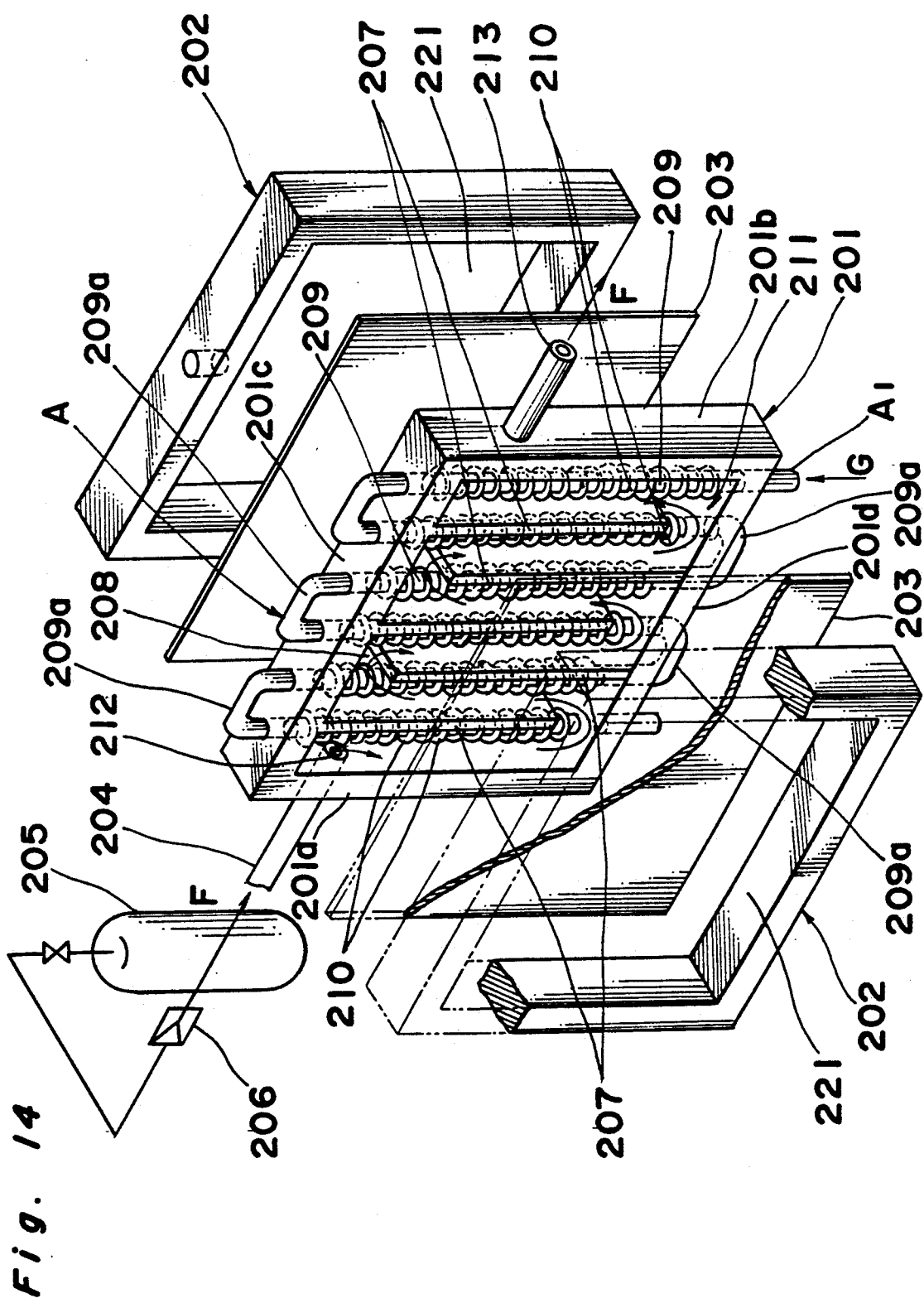
FIG. 14 is a decomposed perspective view showing the module construction of the liquid separating apparatus in the embodiment 8 of the present invention.

FIG. 14 and FIG. 15 show such a liquid separating apparatus as in the embodiment 8 of the present invention.

In the liquid separating apparatus of the present embodiment, many disc-shaped heating fins 210, 210 . . . are formed on the outer peripherally of each heating pipe 209 in the liquid separating apparatus of the embodiment 7. The heating fins 210, 210 . . . have heating operations by the heating pipes 209, 209 . . . and an operation for furthermore promoting the turbulence of the feed liquid. As the other construction and operations are similar to those of the embodiment 7, the description thereof will be omitted.

In the above-described illustration, although the present embodiment is applied to a case where the water component is separated from the alcohol water solution to obtain the alcohol of the high concentration, the present invention is, needless to say, applied to a case where the particular component from the other mixed liquids (for example, azeotropic mixed liquids, approximate boiling point mixed liquids, and so on) may be separated by the proper selection of the material quality of the selective transmission membrane.

EMBODIMENT 9

Figure 17:
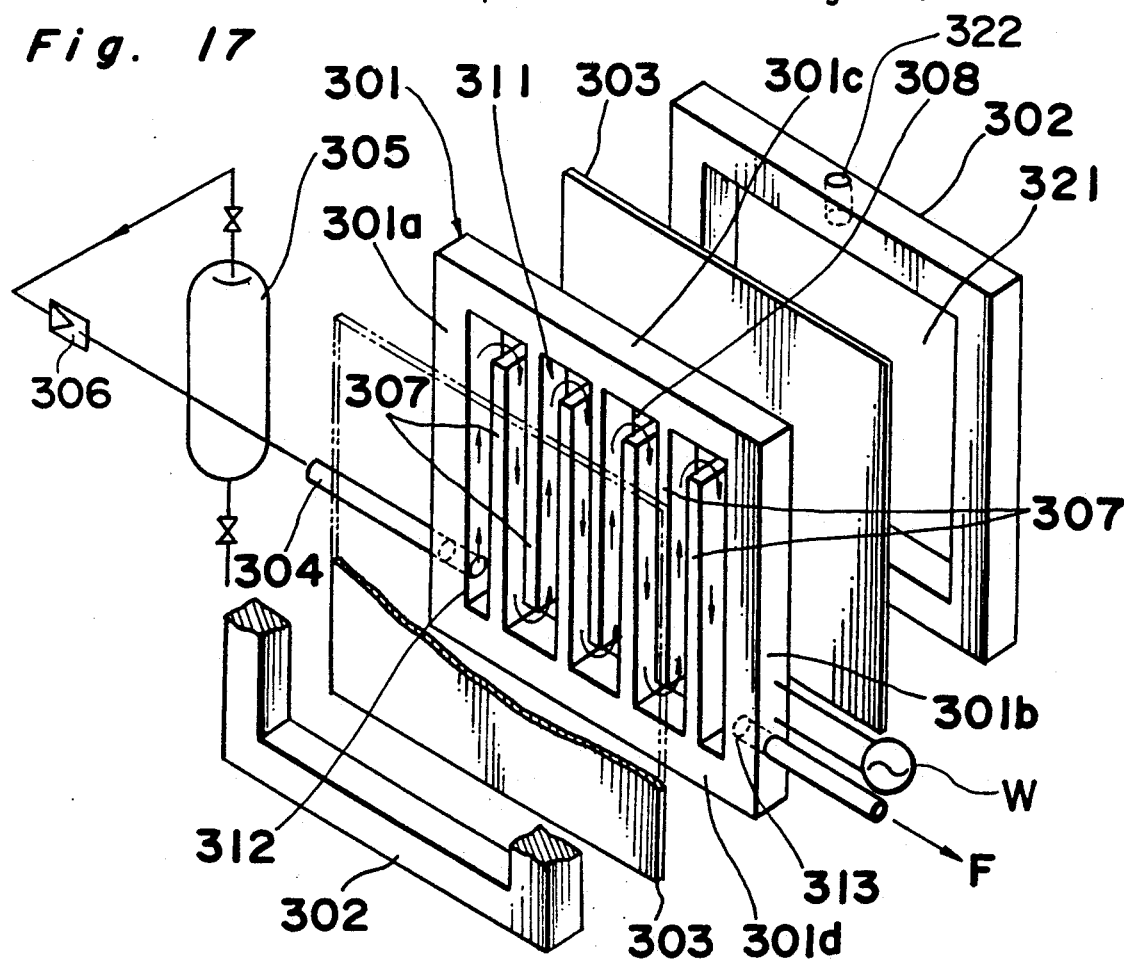
FIG. 17 is a decomposed perspective view showing the module construction of the liquid separating apparatus in the embodiment 9 of the present invention.
Figure 18:
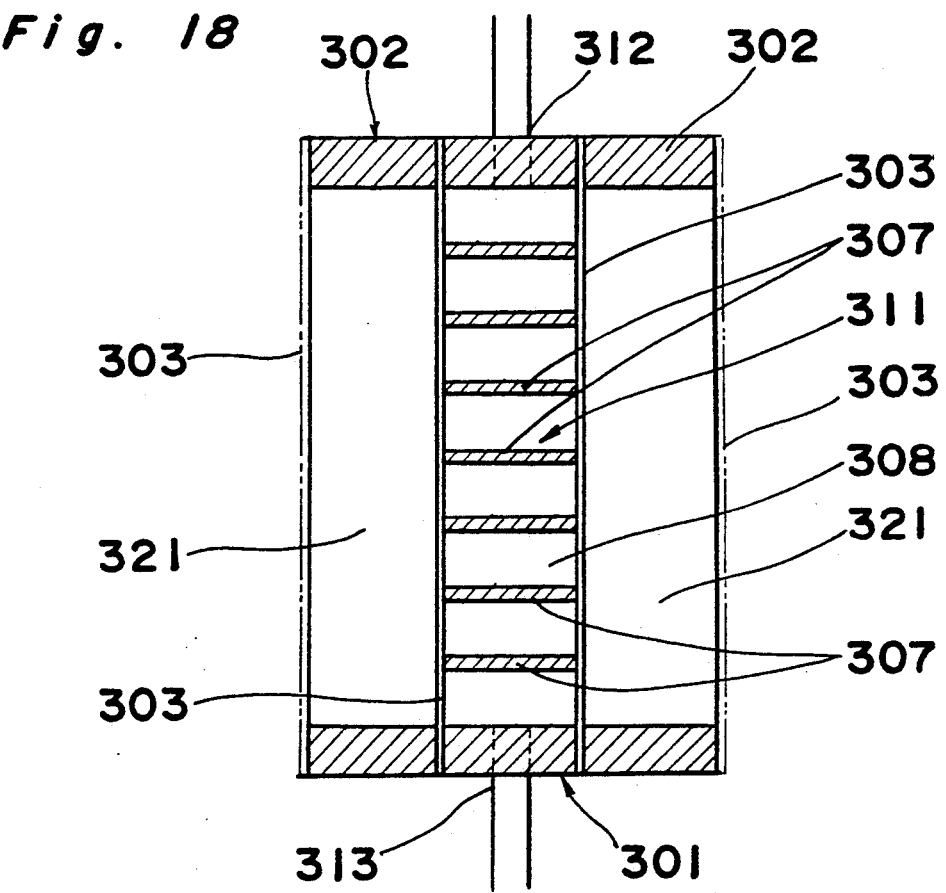
FIG. 18 is a lateral sectional view of the liquid separating apparatus shown in FIG. 17.

FIG. 17 and FIG. 18 show a liquid separating apparatus in the embodiment 9 of the present invention.

The liquid separating apparatus of the present embodiment is of a module construction of a plate and frame type, with the illustrated one showing a simple member of the module.

Also, the liquid separating apparatus of the present embodiment has an alcohol water solution diluted with water as an object mixed liquid, and is used as an apparatus for separating the water ($H_2O$), or a separating object component from the alcohol water solution by a permeation evaporation method so as to condense the alcohol.

The liquid separating apparatus (concretely a simple member module for separating the liquid) is composed of a first frame 301 for forming the primary chamber 311 on the high pressure side for feeding the mixed liquids (namely, alcohol water solution), second frames 302, 302 which are adjacently disposed on both the side of the first frame 301, and form the secondary chambers 321, 321 on the low pressure side, selective transmission membranes 303, 303 disposed between the first frame 301 and the second frames 302, 302.

The first frame 301 is composed of rectangular frame member, with a mixed liquid feeding opening 312 which is communicated with the feed tank 305 through the feed pipe 304 being provided in the lower portion of the front frame 301a. Reference character 306 is a feed pump. Also, an exhaust opening 313 which exhausts the product alcohol, whose water ($H_2O$) as a separating object component is transmitted, removed and condensed, is provided in the upper portion of the rear frame 301b of the first frame 301. A plurality of alternately adjacent partition walls 307, 307 . . . are projected from the inner faces of upper, lower frames 301c, 301d of the first frame 301, with the tip ends of these partitioned walls 307, 307 . . . being confronted in the positions away at given intervals from the inner faces of the mutually opposite frames 301c, 301c. A series of slender, folded flow passages 308 towards the exhaust opening 313 from the feed opening 312 are formed among the partitioned walls 307, 307 . . . . Namely, within the primary chamber 311 to be formed within the first frame 301, the mixed liquids F are adapted to be circulated along the flow passage 308 towards the exhaust opening 313 from the feed opening 312, with a flow passage construction that a liquid for circulating onto the entrance side is not mixed with the liquid for circulating onto the exit side. Also, when the pressure difference between the primary chamber 311 and the secondary chamber 321 is not too much as in the start operation or the stop operation of the apparatus, the selective transmission membranes 303, 303 may be oscillated due to the circulation of the mixed liquids, but the selective transmission membranes 303, 303 on both the sides of the primary chamber 311 are prevented from coming into contact against each other by the existence of the partitioned walls 307, 307 . . . . Namely, these partitioned walls 307, 307 . . . serve as spacers for retaining the interval between both the selective transmission membranes 303, 303. On the inner surfaces of the primary chamber 311 and the outer surfaces of the partition walls 307 of the first frame 301 there provides a electric heating film (not shown), which is connected with an electric power source W provided at the outside of the first frame 301 so as to generate a heat for heating the mixed liquid flowing within the primary chamber 311 of the firs frame 301.

As the flowing passage 308 is effective if it is made as slender as possible, the number of the partitioned walls 307, 307 . . . to be formed is desired to be more in a range where the inner pressure loss does not exceed the tolerance range. Also, the contact portion between each partitioned wall 307 and the selective transmission membrane 303 is desired to be made as thin as possible in the thickness of the partitioned wall 307, as the contact portion thereof becomes a portion where the membrane separating operation cannot be exhibited.

The second frame 302 is composed of the first frame 301 and a rectangular frame of the same shape. The secondary chamber 321 to be formed within it is partitioned by the primary chamber 311 within the first frame 301 by the selective transmission membrane 303. The second frame 302 has a suction opening 322 therein to be connected with a vacuum pump (not shown) which serves as a pressure reducing means for reducing the pressure within the secondary chamber 321 into an approximate vacuum condition.

The selective transmission membrane 303 is composed of an amorphous high molecular membrane having a quality through which only a particular component molecule (in the case of the present embodiment, water molecule) to be contained in the mixed liquids is selectively transmitted. The selective transmission membrane has an action of transmitting into the secondary chamber 321 the water molecule only from the mixed liquids circulating through the primary chamber 311. For example, α- fluoro acrylic inter-polymer or ethylene unsaturated compound (for example, styrene, vinyl chloride, acrylonitrile, hydroxy ethyl acrylate, acrylic acid or the like) copolymerized with the α-fluoro acrylic interpolymer to mold a membrane shape is used as the selective transmission membrane 303.

The operation of the liquid separating apparatus shown will be described hereinafter.

An alcohol water solution (namely, alcohol diluted with water) to be continuously fed into the mixed liquid feeding opening 312 through the feed pump 306 from the feed tank 305 flows slowly along the flow passage 308 formed within the primary chamber 311 is accordance with the feed thereof and the exhaust speed thereof.

The secondary chamber 321 is reduced in pressure so that the pressure may become an approximate vacuum condition by the operation of the pressure reducing means simultaneously with the feeding of the alcohol water solution into the primary chamber 311. As a result, the pressure difference more than the given value is adapted to be realized between the primary chamber 311 side and the secondary chamber 321 side in the selective transmission membrane 303.

As described hereinabove, the selective transmission membrane 303 in the present embodiment is composed of an amorphous high molecular membrane having characteristics which allow only the water molecule as the separating object component. The water molecule corresponding to the selective characteristics is transmitted from the primary 311 to the secondary 321 at a transmission speed proportional to the partial pressure difference of the water molecule between the primary chamber 311 and the secondary chamber 321. Thus, the alcohol water solution flowing through the flow passage 308 is gradually condensed by the transmission separation of the water molecule from the primary chamber 311 to the secondary chamber 321 into the high concentration of alcohol and is exhausted from the exhaust opening 313. In this process, as the mixed liquids F are flowed along a slender flow passage 308 partitioned by the partitioned walls 307, 307 . . . , the low concentration liquid near the entrance side (namely, feed opening 312) and the high concentration liquid near the exit side (namely, the exhaust opening 313) do not cause the mixed dilution any more, so that the performance close to the separation performance under the ideal conditions shown by the characteristic curve g shown in FIG. 6 may be maintained.

Also, when the high, low pressure difference between the primary chamber 311 and the secondary chamber 321 is not too much as at the start of the apparatus, the stop thereof or the like, the selective transmission membranes 303, 303 may be oscillated due to the circulation of the mixed liquids circulating through the primary chamber 311, but the partitioned walls, 307, 307 . . . serve as spacers for preventing the contact of both the selective transmission membranes 303, 303, thus greatly contributing towards the improvement in the durability thereof.

Embodiment 10

Figure 19:
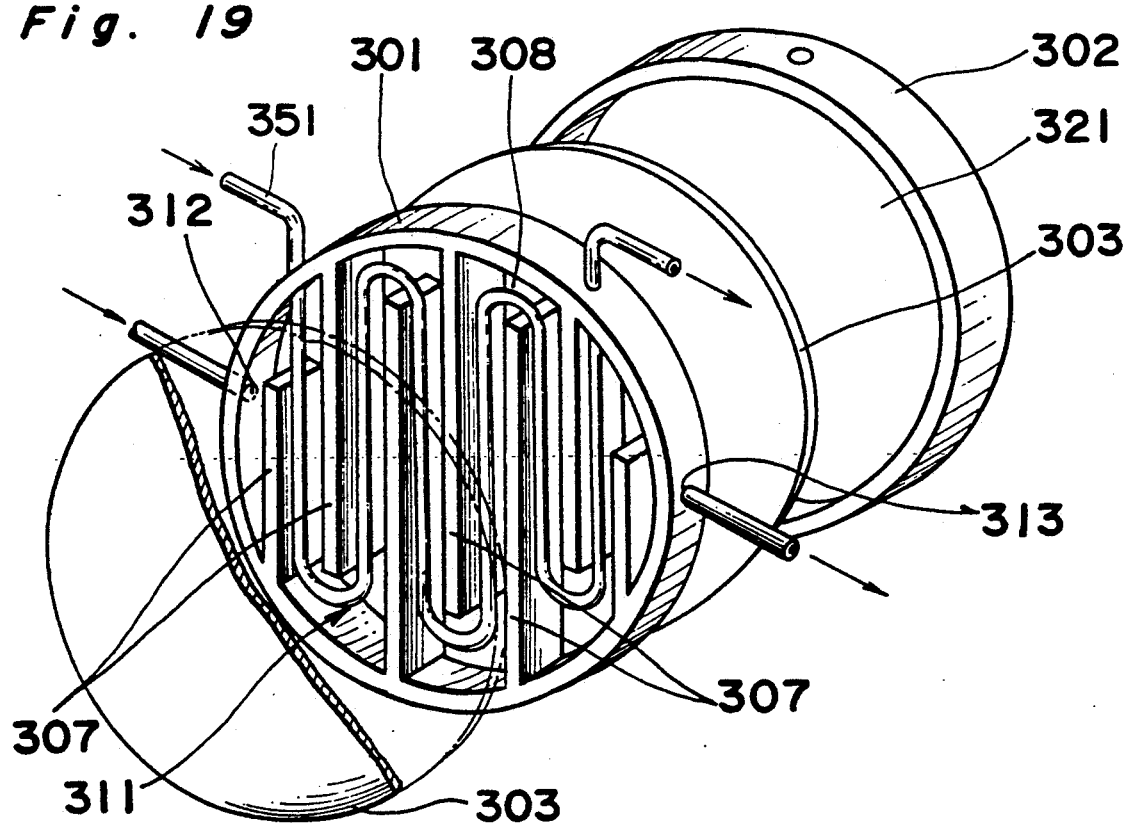
FIG. 19 through FIG. 21 are decomposed perspective views showing the module construction of the liquid separating apparatus in the embodiment 10 or the embodiment 12 of the present invention, respectively.

FIG. 19 shows a liquid separating apparatus in the embodiment 10 of the present invention.

In the case of the liquid separating apparatus of the present embodiment, the first frame 301 constituting the primary chamber 311 and the second frame 302 constituting the secondary chamber 321 are both ring-shaped in the same diameter, with the selective transmission membrane 303 being disc-shaped. The partitioned walls 307, 307 . . . which are alternately projected in the vertical direction are formed on the inner wall of the first frame 301, and the tip ends of these partitioned walls 307, 307 . . . are confronted in positions away at the given intervals from the opposite inner wall. Namely, even in the present embodiment, as in the embodiment 1, the interior of the primary chamber 311 is partitioned by the partitioned walls 307, 107 . . . , with a series of slender flow passage 8 directed from the entrance side (namely, the feed opening 312) to the exit side (namely, the exhaust opening 313) being formed. Within the primary chamber 311 of the first frame 301, there provides a pipe of sheathed wire heater 351 which is passed through between the partitioned walls 307, and is connected with an electric power source (not shown) provided at the outside of the first frame 301 so as to generate a heat for heating the mixed liquid flowing within the primary chamber 311 of the first frame 301. As the other constructions and the operations are similar to those of the embodiment 1, the description will be omitted to avoid the repetition thereof.

Embodiment 11

Figure 20:
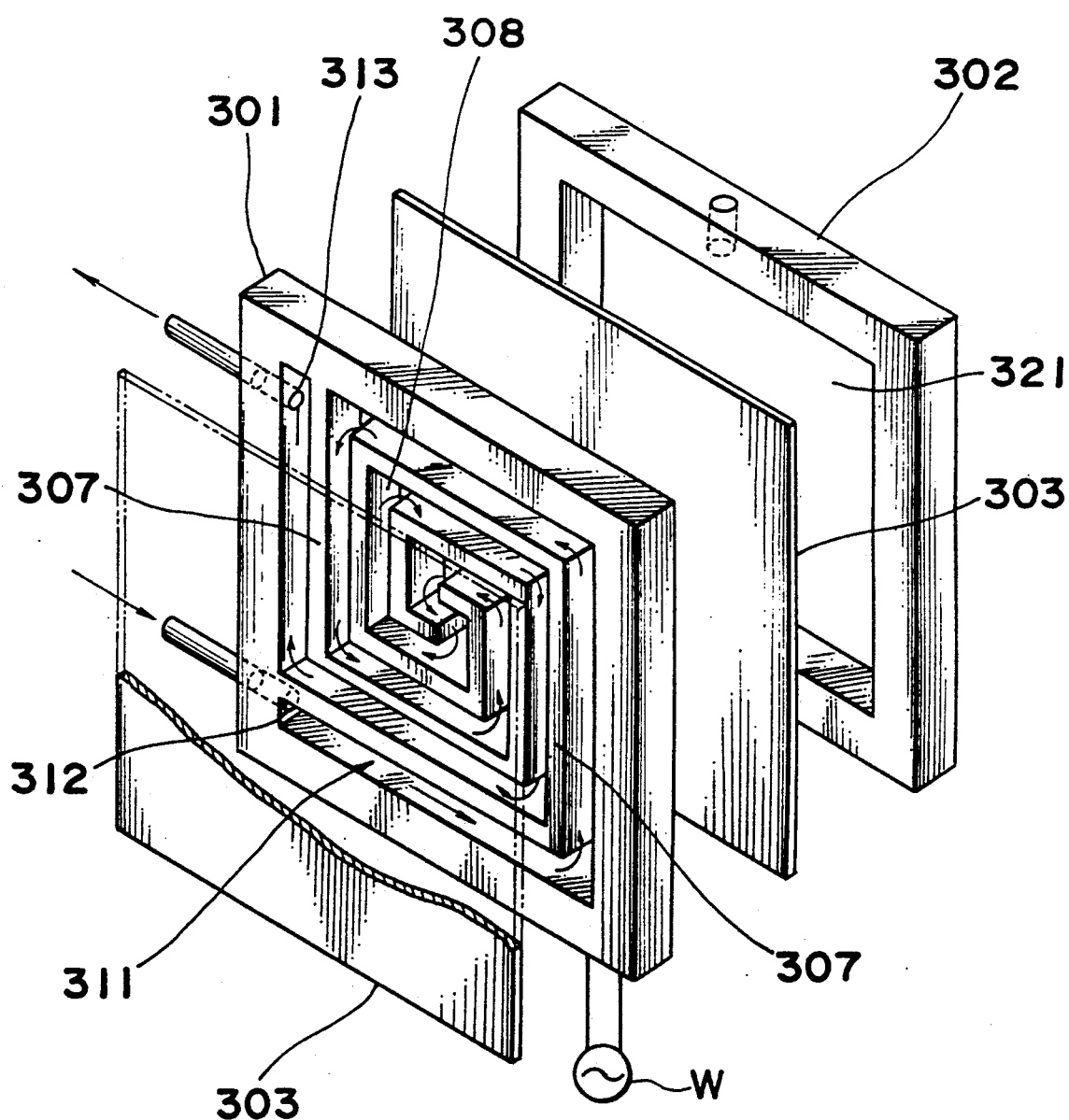

FIG. 20 shows a liquid separating apparatus in the embodiment 11 of the present invention.

In the case of the liquid separating apparatus of the present embodiment, the first frame 301 constituting the primary chamber 311 and the second frame 302 constituting the secondary chamber 321 are both rectangular as in the embodiment 301, with the selective transmission membrane 303 being also of rectangular plate shape. A pair of spiral partitioned walls 307, 307 extending along the inner wall shape towards the central portion of the first frame 301 from the inner wall are projected from the inner wall of the first frame, with a series of slender flow passages 308 directed from the entrance side (namely, the feeding opening 312) to the exit side (namely, the exhaust opening 313) being formed between the partitioned walls 307, 307. On the inner surfaces of the primary chamber 311 and the outer surfaces of the partition walls 307 of the first frame 301 there provides an electric heating film (not shown), which is connected with an electric power source W provided at the outside of the first frame 301 so as to generate a heat for heating the mixed liquid flowing within the primary chamber 311 of the first frame 301. As the other constructions and operations are similar to those in the embodiment 1, the illustration will be omitted to avoid the repetition thereof.

Embodiment 12

Figure 21:
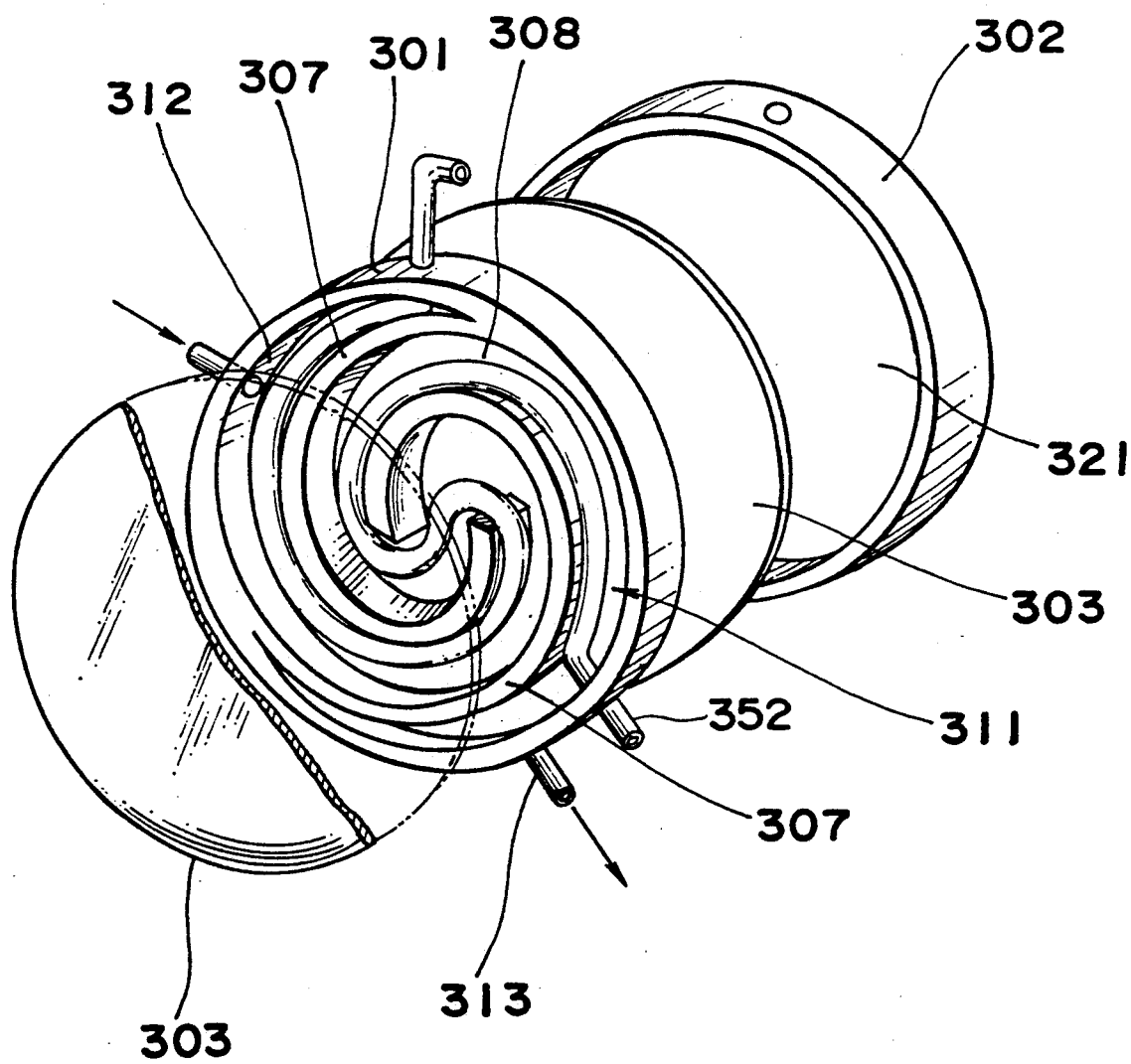

FIG. 21 shows a liquid separating apparatus in the embodiment 12 of the present invention.

In the case of the liquid separating apparatus of the present embodiment, the first 301 constituting the primary chamber 311 and the second frame 302 constituting the secondary chamber 321 are ring-shaped as in the embodiment 10 with the selective transmission membrane 303 being disc-shaped. A pair of spiralled-shaped partitioned 307, 307 . . . extending along the inner wall shape towards the central portion of the first frame 301 from the inner wall are projected from the inner wall of the first frame 301, with a series of slender flow passage 308 directed from the entrance side (namely, the feed opening 312) to the exit side (namely, the exhaust opening 313) being formed between the partitioned walls 307 and 307. Within the primary chamber 311 of the first frame 301, there provides a pipe 352 for hot water is passed through between the partitioned walls 307, and is adapted to circulate hot water therein so as to exchange a heat for heating the mixture liquid flowing within the primary chamber 311 of the first frame 301. As the other constructions and the operations are similar to those of the embodiment 1, the description will be omitted to avoid the repetition thereof.

In the above-described illustration, although the present embodiment is applied to a case where the water component is separated from the alcohol water solution to obtain the alcohol of the high concentration, the present invention is, needless to say, applied to a case where the particular component from the other mixed liquids (for example, azeotropic mixed liquid, approximate boiling point mixed liquids, and so on) may be separated by the proper selection of the material quality of the selective transmission.

EMBODIMENT 13

Figure 22:
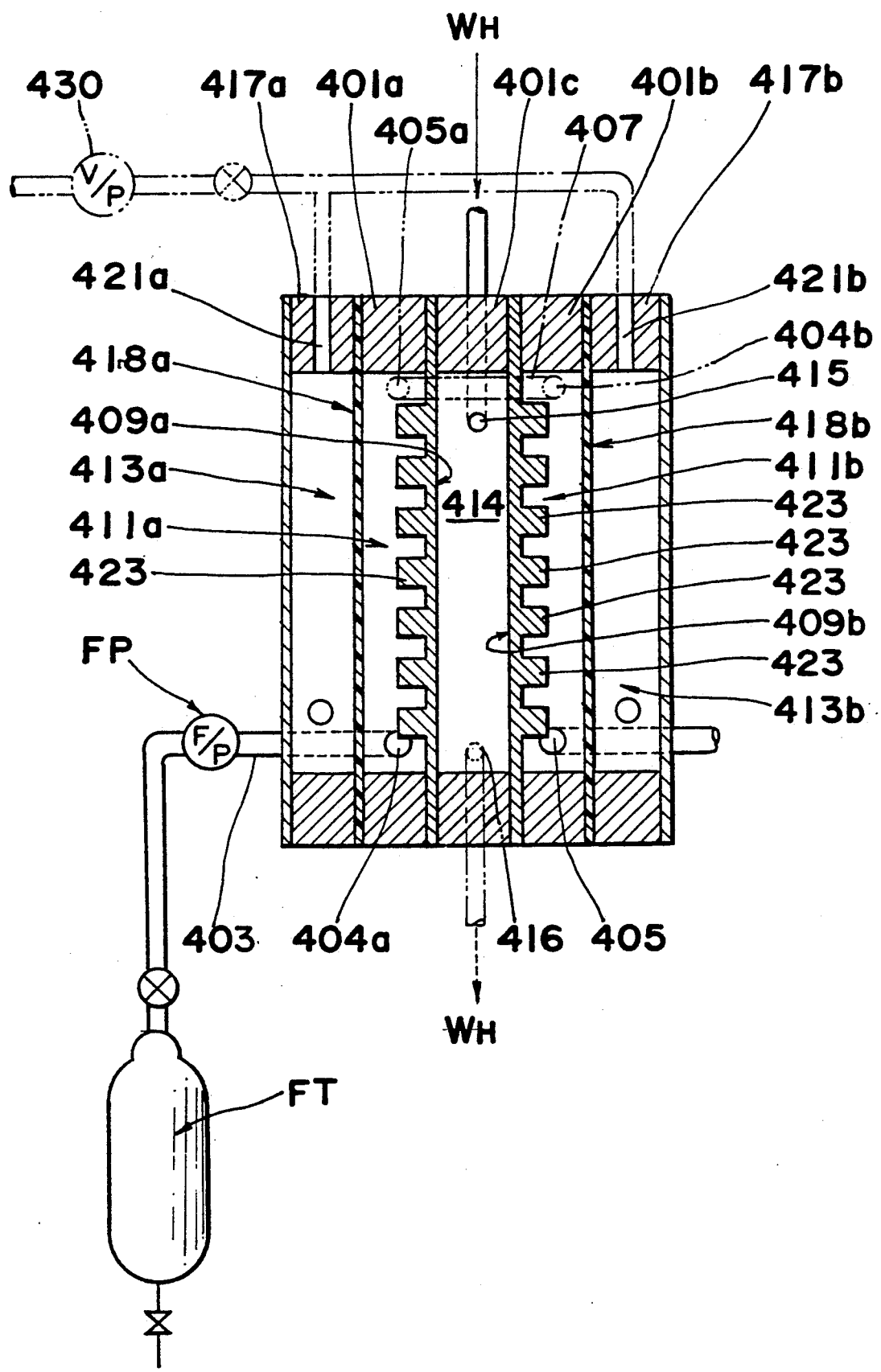
FIG. 22 is a sectional view showing the module construction of the liquid separating apparatus in the first embodiment 13 of the present invention.
Figure 23:
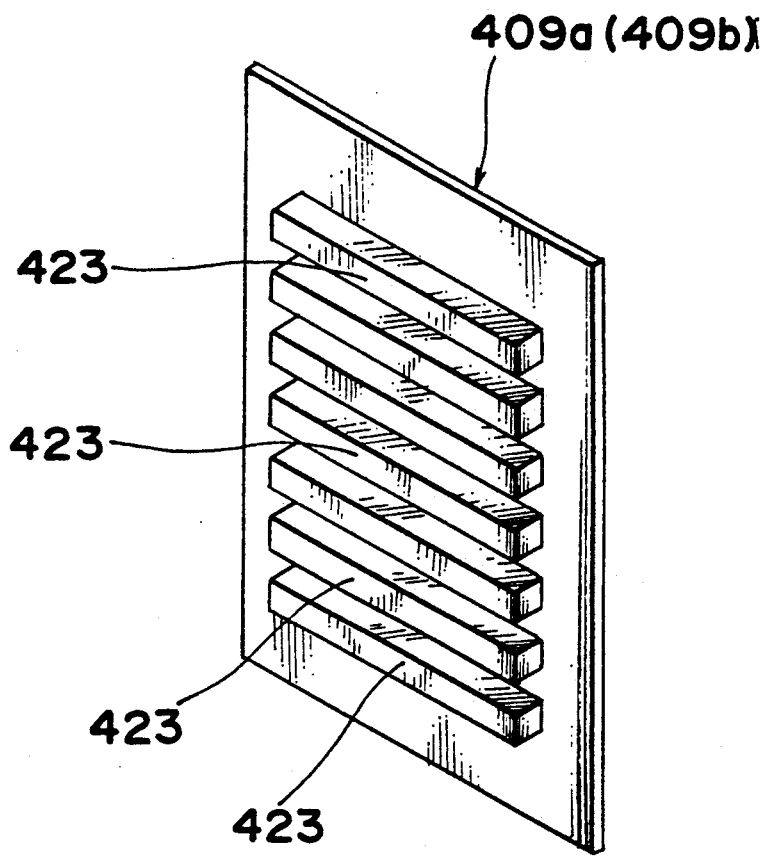
FIG. 23 is a perspective view of the essential portions of the apparatus of FIG. 22.
Figure 24:
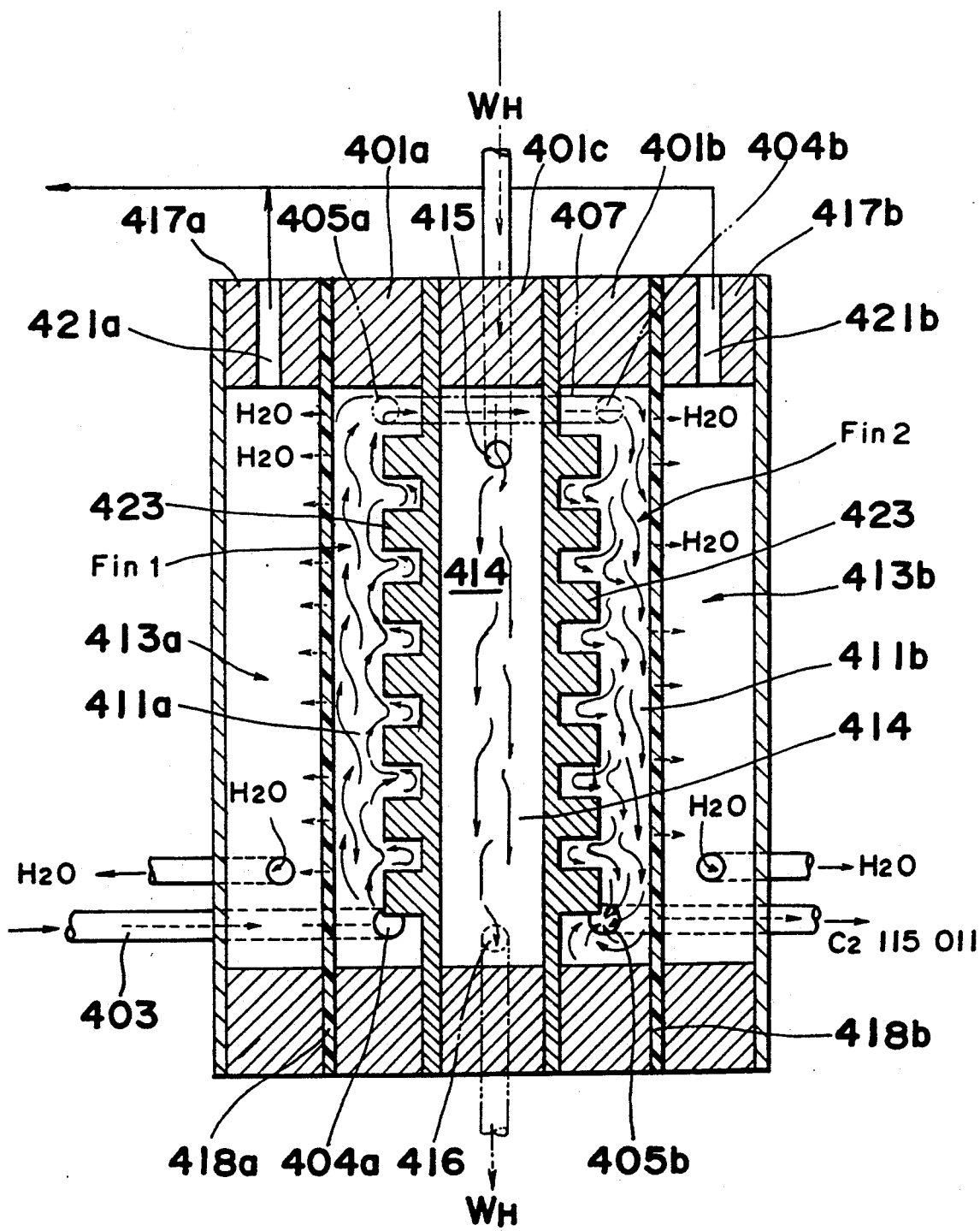
FIG. 24 is a schematic sectional view for illustrating the operation of the construction of the essential portions of the apparatus of FIG. 22.

FIG. 22 through FIG. 24 show the module construction of the liquid separating apparatus of, for example, a plate and frame type in the embodiment 13 of the present invention.

The reference characters 401a, 401b in FIG. 22 shown the first and second frames of the given width, which are adjacent to each other to form the first and second primary chambers 411a, 411b on the high pressure side for feeding the mixed liquids as shown in FIG. 24. The first mixed liquids feeding opening 404a which is communicated with the feed tank FT through the feed pipe 403 is provided on the first frame 401a, for example, under the front end portion thereof. Also, a first concentration liquid exhaust opening 405a (shown in an imaginary line) for exhausting, for example, concentration alcohol, ethyl alcohol ($C_2H_5OH$) after the water ($H_2O$) which is a separating liquid (permeate) of an object has been permeated, removed is provided above the side of the rear end portion. Also, a second mixed liquid feed opening 404b (shown in an imaginary line) is provided on the second frame 401b, corresponding to the position (on this side in the drawing) of the first concentration liquid exhaust opening 405a of the first frame 501a. The second mixed liquid feed opening 404b is adapted to be connected with the first concentration liquid exhaust opening 405a through a U-shaped coupling pipe 407. Accordingly, the mixed liquids (feed) Fin1, Fin2 fed from the first mixed liquid feed opening 404a are guided into the second mixed liquid feed opening 404b through the U-shaped coupling pipe 407 from the first concentration liquid exhaust opening 405a after they have received the primary concentration (primary dehydration) treatment through the first primary chamber 411a on the high pressure side as described in, for example, FIG. 3. Thereafter, the mixed liquids are fed as the secondary feed mixed liquid Fin2 into the second primary 411b on the high pressure side. The second concentration liquid exhaust opening 405b is provided in the lower portion on the other end side of the second frame 401b. The feed mixed liquid Fin2 within the second primary chamber 411b on the high pressure side is adapted to be exhausted onto the next treating chamber side from the second concentration liquid exhaust opening 405b.

Reference character 401C is a third frame of the given width fixedly spliced integrally through the first and second heating plates 409a, 409b, or a pair of heat transfer plates, respectively between the adjacent first and second frames 401a, 401b, with a warm water circulation chamber being formed on the inner side of the third frame 401c. Warm water $W_H$ is fed from the warm water feed opening 415 into the warm water circulation chamber 414, and is exhausted sequentially from the warm water exhaust opening 416, with the warm water within the warm water circulation chamber 414 being adapted to be normally retained in a constant temperature condition. The temperature of the warm water $W_H$ is transmitted into each of the mixed liquids Fin1, Fin2 within the first and second primary chambers 411a, 411b on the high pressure side through the heating plates 409a, 409b so as to overheat the mixed liquids Fin1, Fin2. In this case, the contact faces against the mixed liquids Fin1, Fin2 of the heating plates 409a, 409b are extended in a direction so that a plurality of projection portions 423, 423 . . . may become approximately orthogonal with respect to the flowing direction of the mixed liquids Fin1, Fin2 as shown in FIG. 23. Therefore, the heating area may be enlarge widely and the flows of the mixed liquids are stirred to form the turbulence.

Reference characters 418a, 418b selective transmission membranes composed of, for example, water selective amorphous high molecular membranes (described later) which are mounted on the left or right opening face side of the first and second frames 401a, 401b, and blockade the space (first and second primary chambers 411a, 411b on the high pressure side) within each frame. The fourth and fifth frames 417a, 417b adjacent onto the outer side of the first second frames 441a, 441b are integrated with the first and second frames 401a, 401b through the selective transmission membranes 418a, 418b, with the first and second secondary chambers 413a, 413b on the low pressure side for drawing out the moisture ($H_2O$) through each of the selective transmission membranes 418a, 418b being formed on the inner side thereof. Each of the secondary chambers 413a, 413b on the low pressure side is connected with the pressure reducing means such as vacuum pump or the like through the first and second suction openings 421a, 421b. The interior of each of the first and second secondary chambers 413a, 413b on the low pressure side is adapted to be reduced in pressure through the action of the pressure reducing means 430.

Accordingly, according to the liquid separating apparatus using a permeation evaporation method of the construction of the embodiment, the mixed liquids (feed) of water ($H_2O$) and alcohol (ethyl alcohol): $C_2H_5OH$ to be continuously fed, introduced into the first primary chamber 411a on the high pressure side from the first mixed liquid feed opening 404a through, for example, the feed tank FT from the feed tank FT flows slowly from the lower side onto the upper side into the first primary chamber 411a on the high pressure side within the given time period in accordance with the feed thereof and the exhaust speed thereof (see FIG. 24).

In the condition, the side of the first secondary chamber 413a on the low pressure side is reduced in pressure into an approximate vacuum condition so as to realize the partial pressure difference more than the given value between the primary chamber side selection molecule adsorption face of the first selective transmission membrane 418a and the secondary chamber side selection molecule disconnection face thereof. The selective transmission membrane 418a in the present embodiment as described hereinabove selectively transmits the water ($H_2O$) component only as the object. It is formed of a water transmission amorphous high molecular membrane (for example, as disclosed in the specification of Japanese Patent Application No. 62-35401) composed of, for example, "α-fluoro acrylate copolymer".

The water component ($H_2O$ molecule) corresponding to the selection characteristics thereof is transmitted from the first primary chamber 411a on the high pressure side into the second secondary chamber 413a on the low pressure side at the transmission speed proportional to the temperature of the mixed liquids themselves, and the concentration difference of the selection component ($H_2O$) between the first primary chamber 411a side on the high pressure side and the first secondary chamber 413a side on the low pressure side.

In this case, in the transmission of the water component ($H_2O$), the water molecule $H_2O$ in the mixed liquids within the first primary chamber 411a on the high pressure side is absorbed on the selective transmission membrane 418a at first through the material transfer energies accompanied by the concentration difference from the high pressure side onto the low pressure side. Thereafter, the water molecule $H_2O$ is melted, diffused into the transmission membrane 418a by the molecular movement accompanied by the resolution action. The melted and diffused amount of the water molecule $H_2O$ at this time largely depends upon the temperature of the mixture liquids, and the partial pressure difference (if the concentration is the same, the material molecule moves from the higher pressure into the lower pressure) between both the boundary faces of the transmission membranes 418a or the concentration difference (when the pressure is equal, the material molecule moves from the higher concentration to the lower concentration) of the selection molecule $H_2O$, or the like. In this case, the partial pressure difference may be comparatively easily controlled into an ideal value by the constant maintenance of the feed pressure through the feed pump FP on the mixed liquid feed side, and also, by the constant maintenance of the reduced value through the pressure reducing means.

But the temperature of the mixed liquids themselves on the side of the primary chamber on the high pressure side and the concentration difference of the selection component ($H_2O$ molecule) may not be easily maintained at a desired value, considering the following situation. Namely, as described hereinabove, the transmission action at the selective transmission membranes 418a naturally accompanies phase variation (liquid phase→gaseous phase) of the water component $H_2O$ which is a selection molecule. Thus, as the separating action is advanced, the evaporation latent heat amount is increased to lower the temperature on the mixed liquid side. Such a situation is completely the same even on the side of the second primary chamber 411b on the high pressure side.

But, as described hereinabove, the transmission speed of the water molecule for transmitting through each of the selective transmission membranes 418a, 418b becomes higher when the temperature of the mixed liquids is higher (under the ideal conditions) as described from the alcohol concentration degree characteristics of FIG. 4, and is superior in transmission performance. Accordingly, in the construction of the present embodiment, the mixed liquids Fin1, Fin2 within the first and second primary chambers 411a, 411b on the high pressure side are adapted to be equally heated, raised in temperature from the entrance side thereof onto the exit side thereof through the heating plates 409a, 409b in the warm water circulation chamber 414 with the warm water $W_H$ passing therethrough. Therefore, the temperature fall of the mixed liquids through the evaporation latent heat, especially the reduction in the transmission speed of the water molecule $H_2O$ is compensated for (the ideal temperature conditions of FIG. 4 are maintained).

As the selective transmission membranes 418a, 418b are constructed as water selective one as described already, a continuous layer with the water molecule $H_2O$ component being short is formed inevitably on the side of the adsorption face by the continuous transmission of the water molecule $H_2O$. This is generally called concentration boundary membrane, with a problem that the concentration difference is largely reduced to deteriorate the transmission speed, the transmission efficiency of the water component (see FIG. 5).

But, as described hereinabove, in the present embodiment, a plurality of projection portions 423, 423 . . . vertically extended as described hereinabove at the given intervals from the side of each of the first, second mixed liquid feed openings 404a, 404b of the central portion within the first and second primary chambers 411a, 411b on the high pressure side onto the side of the first, second exhaust openings 405a, 405b and are disposed approximately orthogonal with respect to the direction along which the mixed liquids flow.

Thus, as shown in the arrow (imaginary line) of FIG. 24, the liquid flowing from the side of each of the mixed liquids feed openings 404a, 404b onto the side of the concentrated liquid exhaust openings 405a, 405b is spread right and left, sequentially forming the turbulence in each of the projection portions 423, 423 . . . portions, to stir the mixed liquid, so that the above-described concentration boundary membrane is destroyed, removed by the stirring action. As a result, the described concentration difference may be maintained as described, thus realizing higher transmission speed and transmission efficiency of the water component even in terms of this point.

Figure 25:
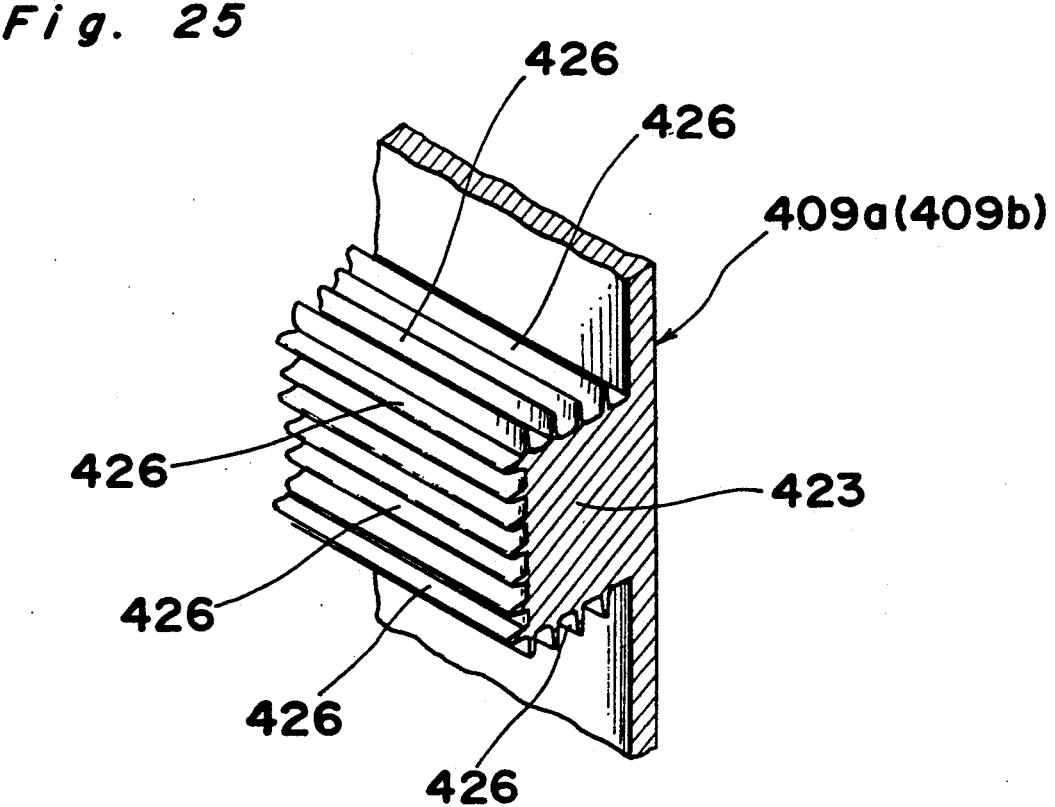
FIG. 25 is a sectional view of a liquid separating apparatus in a modification of the embodiment 13 of the present invention.

Although the improvement in the heating efficiency and the turbulence forming effect by the stirring operation of the mixed liquids by the formation of a plurality of projection portions 423, 423 . . . on the contact faces with the mixed liquids Fin1, Fin2 are realized int eh heating plates 409a, 409b in the first embodiment, the construction of additionally providing many fins 426, 426 . . . on the outer peripheral faces of the plurality of projection portions 423, 423 . . is also adopted when necessary as in FIG. 25 as, for example, a modification of the embodiment 13 in order to improve these effects more. As the construction of projection portions 423 with such fins 426 provided on them is capable of enlarging the heat exchanging areas on the contact faces between the mixed liquids Fin1, Fin2, the heating efficiency of the mixed liquids is improved by the warm water, also the flow stirring effect of the mixed liquid, thus making it possible to form the complicated, effective turbulence. Thus, the effect of improving the transmission efficiency is also high.

In the above-described embodiment, although alcohol mixed liquids containing water as the feed mixed liquids is adopted, the water ($H_2O$) is set as a separation liquid (permeate) of the purpose, it is needless to say that the object of the liquid separation of the present invention is not restricted to it.

EMBODIMENT 14

Figure 26:
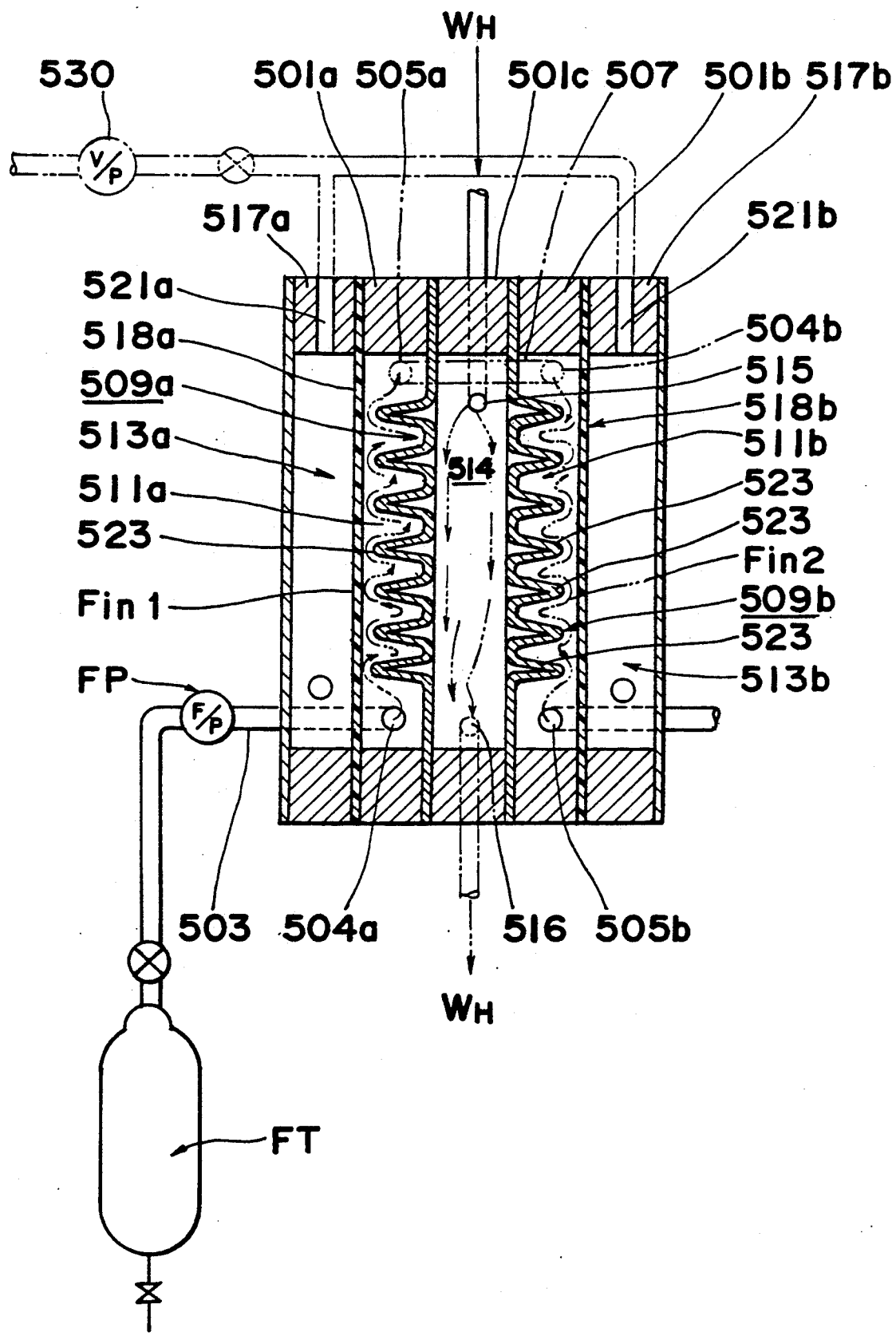
FIG. 26 is a sectional view showing the module construction of the liquid separating apparatus in the first embodiment 14 of the present invention.
Figure 27:
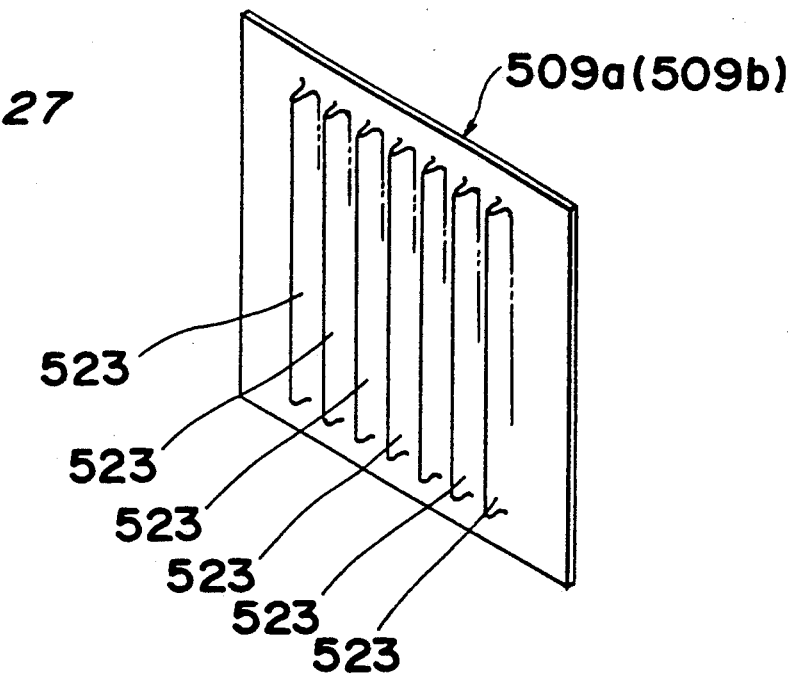
FIG. 27 is a perspective view of the essential portions of the apparatus of FIG. 26.
Figure 28:
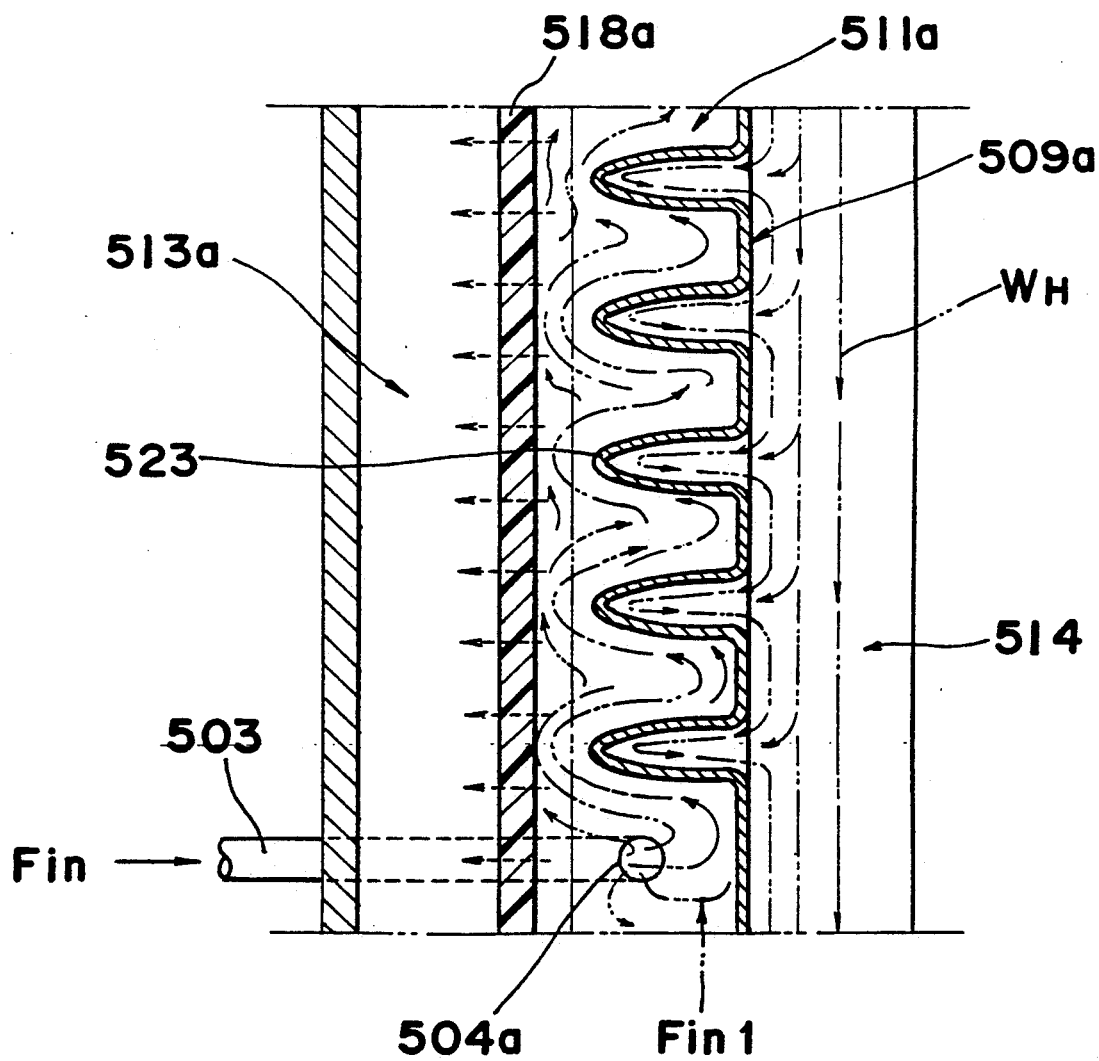
FIG. 28 is a schematic sectional view for illustrating the operation of the construction of the essential portions of the apparatus of FIG. 26.

FIG. 26 through FIG. 28 show the module construction of a liquid separating apparatus of, for example, plate and frame type in the embodiment 14 of the present invention.

The reference characters 501a, 501b in FIG. 26 show the first and second frames of the given width, which are adjacent to each other to form the first and second primary chambers 511a, 511b on the high pressure side for feeding the mixed liquids as shown in FIG. 26. The first mixed liquid feeding opening 504a which is communicated with the feed tank FT through the feed pipe 503 is provided on the first frame 501a, for example, under the front end portion thereof. Also, a first concentration liquid exhaust opening 505a (shown in an imaginary line) for exhausting, for example, concentration alcohol (C2H5OH) after the water ($H_2$)) which is a separating liquid (permeate) of an object has been permeated, removed is provided above the side of the rear end portion. Also, a second mixed liquid feed opening 504b (shown in an imaginary line) is provided on the second frame 501b, corresponding to the position (on this side in the drawing) of the first concentration liquid exhaust opening 405a of the first frame 501a. The second mixed liquid feed opening 504b is adapted to be connected with the first concentration liquid exhaust opening 505a through a U-shaped coupling pipe 507. Accordingly, the mixed liquids (feed) Fin1, Fin2 fed from the first mixed liquid feed opening 504a are guided onto the second mixed liquid feed opening 504b side through the U-shaped coupling pipe 507 from the first concentration liquid exhaust opening 505a after they have received the primary concentration (primary dehydration) through the first primary chamber 511a on the high pressure side as described in, for example, FIG. 28. Thereafter, the mixed liquids are fed as the secondary feed mixed liquid Fin2 into the second primary 511b on the high pressure side. The second concentration liquid exhaust opening 505b is provided in the lower portion on the other end side of the second frame 501b. The feed mixed liquid Fin2 within the second primary chamber 511b on the high pressure side is adapted to be exhausted onto the next treating chamber side from the second concentration liquid exhaust opening 505b.

Reference character 501C is a third frame of the given width fixedly spliced integrally through the first and second heating plates 509a, 509b each made of metallic plate press-moldable and higher in heat transfer rate between the adjacent first and second frames 501a, 501b, with a warm water circulation chamber 514 being formed on the inner side of the third frame 501c. Warm water W is fed from the warm water feed opening 515 into the warm water circulation chamber 514, and is exhausted sequentially from the warm exhaust opening 516, with the warm water within the warm water circulation chamber 514 being adapted to be normally retained in a constant temperature condition. The temperature of the warm water W is transmitted into each mixed liquids Fin1, Fin2 within the first and second primary chambers 511a, 511b on the high pressure side so as to heat the mixed liquids Fin1, Fin2. In this case, the contact faces against the mixed liquids Fin1, Fin2 of the heating plates 509a, 509b are swollen, extended by the press in a direction (longitudinal direction) so that a plurality of projecting fins 523, 523 . . . may become approximately orthogonal with respect to the flowing direction of the mixed liquids Fin1, Fin2 as shown in FIG. 27. The heating area may be enlarged widely and the flows of the mixed liquids are stirred to form the turbulence.

Reference characters 518a, 518b, are selective transmission membranes composed of, for example, water selective amorphous high molecular membrane (described later) which is mounted on the left or right opening face side of the first and second frames 501a, 501b and blockade the space (first and second primary chambers 511a, 511b on the high pressure side) within each frame. The fourth and fifth frames 517a, 517b adjacent onto the outer side of the first, second frames 501a, 501b are integrated with the first and second frames 501a, 501b through the selective transmission membranes 518a, 518b, with first and second secondary chambers (separating liquid chambers) 513a, 513b on the low pressure side for drawing out the moisture ($H_2$)) through each of the selective transmission membranes 518a, 518b are formed on the inner side thereof. Each of the secondary chambers 531a, 513b on the low pressure side is connected with the pressure reducing means such as vacuum pump or the like through the first and second suction openings 521a, 521b. The interior of each of the first and second secondary chambers 531a, 513b on the low pressure side is adapted to be reduced in pressure into the approximate vacuum condition through the action of the pressure reducing means 530.

Accordingly, according to the liquid separating apparatus using a permeation evaporation method of the construction of the embodiment, the mixed liquids (feed) of water ($H_2O$) and alcohol (ethyl alcohol: $C2H5OH$) to be continuously fed, introduced into the first primary chamber 511a on the high pressure side from the first mixed liquid feed opening 504a through, for example, the feed pump FP from the feed tank FT flows slowly from the lower side onto the upper side into the first primary chamber 511a on the high pressure side within the given time in accordance with the feed thereof and the exhaust speed (see FIG. 28).

In the condition, the side of the first secondary chamber 513a on the low pressure side is reduced in pressure into an approximate vacuum condition by the operation of the pressure reducing means so as to realize the partial pressure difference more than the given value between the primary chamber side selection molecule adsorption face of the first selective transmission membrane 518a and the secondary chamber side selection molecule disconnection face. The selective transmission membrane 518a in the present embodiment as described hereinabove selectively transmits only the water ($H_2O$) component as the object. It is formed of a water transmission amorphous high molecular membrane (for example, as disclosed in the specification of Japanese Patent Application No. 62-35401) composed of, for example, "α-fluoro acrylate copolymer". The water component ($H_2$) molecule) corresponding to the selection characteristics thereof is transmitted from the first primary chamber 511a on the high pressure side into the second secondary chamber 513a on the low pressure side at the transmission speed proportional to the temperature of the mixed liquids themselves and to the concentration difference of the selection component ($H_2O$) between the first primary chamber 511a side on the high pressure side and the first secondary chamber 513a side on the low pressure side.

In this case, in the transmission of the water component ($H_2O$), the water molecule $H_2O$ in the mixed liquids within the first primary chamber 511a on the high pressure side is absorbed on the selective transmission membrane 518a at first by the material transfer energies accompanied by the concentration difference from the high pressure side onto the low pressure side thereof. Thereafter, the water molecule $H_2O$ is melted, diffused into the separation membrane 518a through the molecular movement accompanied by the resolution action. The melted and diffused amount of the water molecule $H_2O$ at this time largely depends upon the temperature of the mixed liquids, and the partial pressure difference (if the concentration is the same, the material molecule moves from the higher pressure into the lower pressure) between both the boundary faces of the transmission membranes 518a or the concentration difference (when the pressure is equal, the material molecule moves from the higher concentration to the lower concentration) of the selection molecule $H_2O$, or the like. In this case, the partial pressure difference may be comparatively easily controlled into an ideal value by the constant maintenance of the feed pressure through the feed pump FP on the mixed liquid feed side, and also, by the constant maintenance of the reduced value through the pressure reducing means.

But the temperature of the mixed liquids themselves on the side of the primary chamber on the high pressure side and the concentration difference of the selection component ($H_2O$ molecule) may not be easily maintained at a desired value considering the following situation. Namely, as described hereinabove, the transmission action at the selective transmission membranes 518a is a permeation evaporating action and naturally accompanies phase variation (liquid phase→gaseous phase) of the water component $H_2O$ which is a selection molecule. Thus, as the separation action is advanced, the evaporation latent heat amount is increased to lower the temperature on the mixed liquid side. Such as situation is completely the same even on the side of the second primary chamber 511b on the high pressure side.

But, as described hereinabove, the transmission speed of the water molecule to transmit through each of the selective transmission membranes 518a, 518b becomes higher when the temperature of the mixed liquids is higher (under the ideal conditions) as clear from the alcohol concentration degree characteristics of FIG. 4, and is superior in transmission performance. Accordingly, in the construction of the present embodiment, the mixed liquids Fin1, Fin2 within the first and second primary chambers 511a, 511b on the high pressure side are adapted to be heated equally and efficiently, raised in temperature at a warm water circulation chamber 514 with the warm water passing therethrough from the entrance side thereof onto the exit side thereof through the heating plates 509a, 509b made of metallic plates which are higher at heating rate, are press-modable and have projection fins 523, 523 . . . swollen from the side of the warm water circulation chamber 514 onto the side of the primary chambers 511a, 511b on the high pressure side by the press molding.

Therefore, the temperature fall of the mixed liquids through the evaporation latent heat, especially the reduction in the transmission speed of the water molecule $H_2O$ is compensated for (the ideal temperature conditions of FIG. 4 are maintained). As especially the fins 523, 523 . . . of the present embodiment are formed int eh swollen shaped within the primary chambers 511a, 511b on the high pressure side from the warm water circulation chamber 514 side by the press molding, the warm water is turned into the swollen concave portion to display the better heat transfer efficiency.

As the selective transmission membranes 518a, 518b are constructed as water selective one as described already, a continuous layer with the water molecule $H_2O$ component being short is formed inevitably on the side of the absorption face by the continuous transmission of the water particle $H_2O$. This is generally called concentration boundary membrane, with a problem that the concentration difference is largely reduced to deteriorate the transmission speed, the transmission efficiency of the water component (see FIG. 5).

But, as described hereinabove, in the present embodiment, a plurality of projection fins 523, 523 . . . which are swollen within the primary chambers 511a, 511b on the high pressure side from the side of the warm water circulation chamber 514 by the press molding are vertically extended as described hereinabove at the give intervals from the side of each of the first, second mixed liquid feed openings 504a, 504b of the central portion within the first and second primary chambers 511a, 511b on the high pressure side onto the side of the first, second exhaust openings 505a, 505b and are disposed approximately orthogonal with respect to the direction along which the mixed liquids flow. Thus, as shown in the arrow (imaginary line) of FIG. 26, the liquid flowing from the side of the mixed liquids feed openings 504a, 504b onto the side of the concentrated liquid exhaust openings 505a, 505b is spread right and left, forming the turbulence sequentially in each of the projection fins 523, 523 . . . portions so as to stir the mixed liquid, so that the above-described concentration boundary membrane is destroyed, removed by the stirring action. As a result, the desired concentration difference may be maintained, thus realizing higher transmission speed and transmission efficiency of the water component even in terms of this point.

Although the improvement in the heating efficiency and the turbulence forming effect by the stirring operation of the mixed liquids by the formation of a plurality of projection fins 523, 523 . . . simply in a direction orthogonal to the flows of the mixed liquids on the contact faces with the mixed liquids Fin1, Fin2 are realized in the heating plates 509a, 509b in FIG. 29 as, for example, a modification, the branch flow passages 524, 524 . . . of the complicated mixed liquid may be formed among a plurality of fins 523, 523 . . . by the shorter length of plurality of the press fin portions and the zigzag arrangement thereof in the longitudinal and lateral directions.

In the case of the present embodiment, the fin portions 523, 523 . . . are formed by the press molding, so that any shape may be formed extremely easily.

Figure 31:
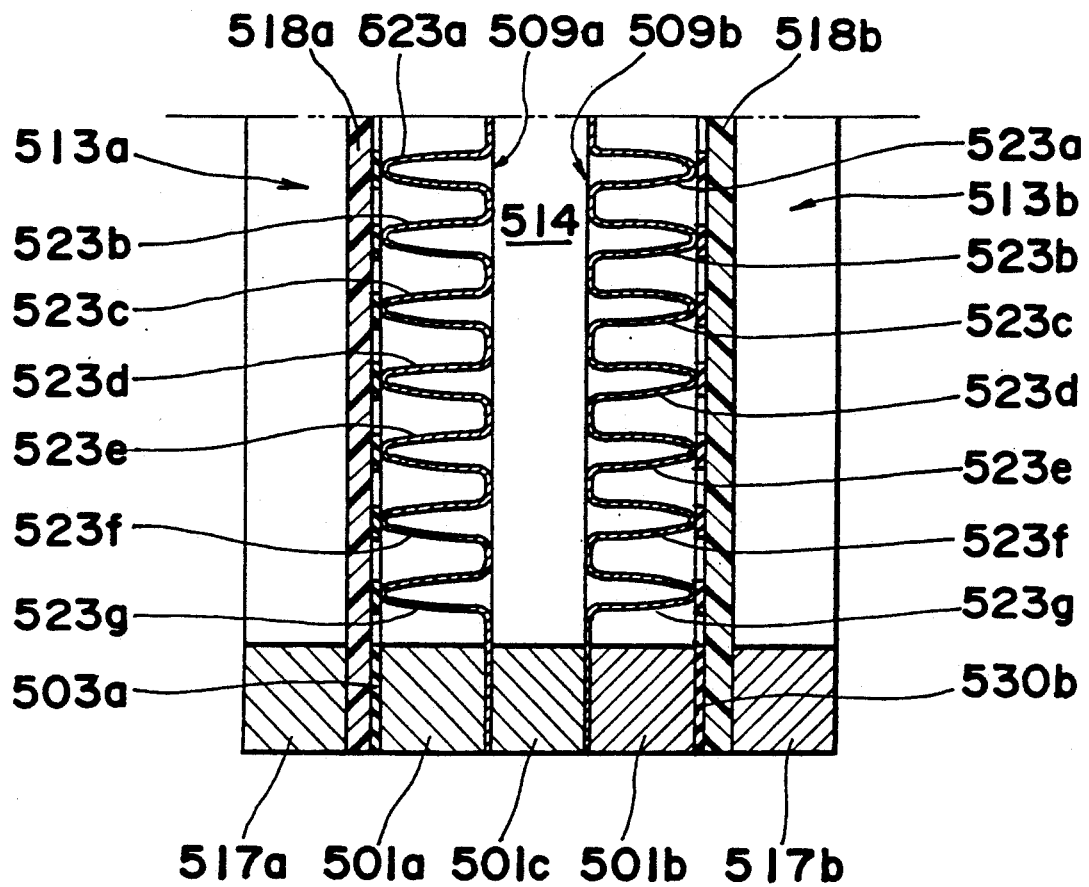
FIG. 31 is a sectional view of the essential portions of FIG. 30.
Figure 32:
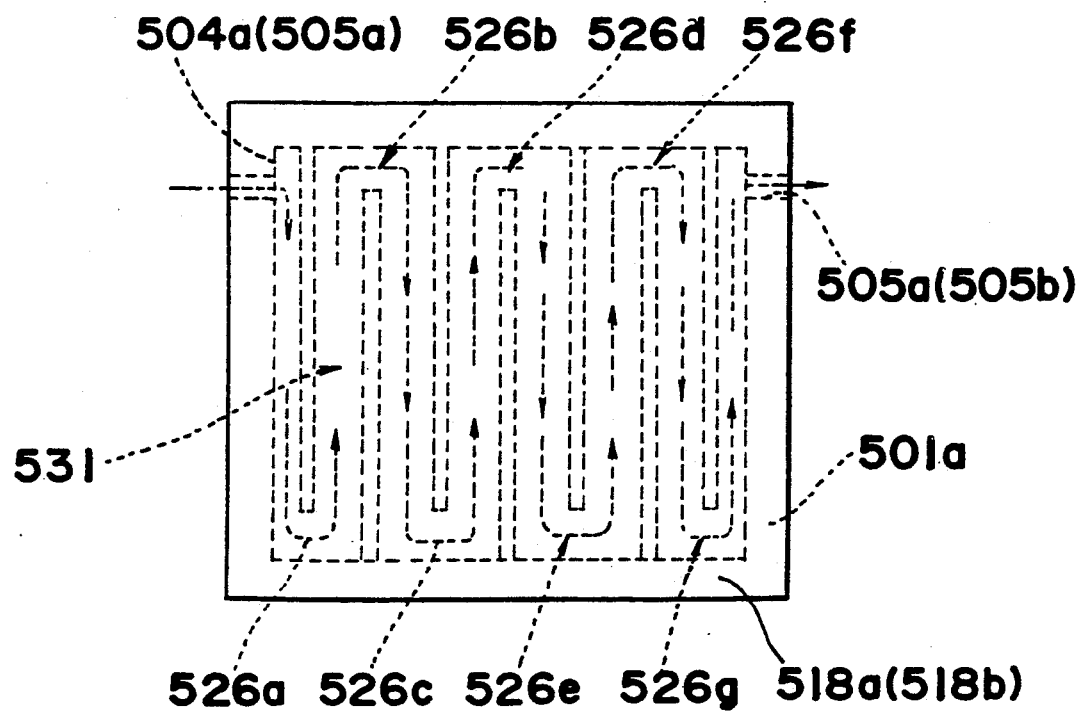
FIG. 32 is a side view of the essential portions of FIG. 30.

The concentration boundary membrane may be removed not only by the turbulence forming method through the stirring operation of the mixed liquids as in the above-described two embodiments, but also by the use of a peeling-off phenomenon to be caused through viscosity resistance on the passage contact face of the liquid. As in FIG. 30 through FIG. 32 as, for example, another modification, the projection fins 523a, 523b, 523c, 523d, 523e, 523f, 523g press-molded as in the first embodiment are disposed every other one in the longitudinal direction, with the vertical direction positions being slid by about n (cm). The height H thereof is formed corresponding to the thickness of the first frame 501a forming the primary chambers 511a, 511b on the high pressure side so as to achieve the spacer function at the built up. On the other hand, packing members 530a, 530b having notch portions 526a through 526g corresponding to the arrangement of the projection fins 523a through 523g are interposed on the sides of the selective transmission membranes 518a, 518b opposite to them so as to form a slender mixed liquid circulating passage 531 extending zigzag to the mixed liquid exhaust opening 504b (505b) from the mixed liquid feed opening 504a (505a) as shown in FIG. 32 to pass the mixed liquids at the comparatively fast flow speed through the interior of the mixed liquid circulating passage 531, so that the concentration boundary membranes themselves may not be originally formed.

While the flow speed is made simply fast, the contact time between the selective transmission membranes 518a, 518b and the mixed liquids Fin1, Fin2 becomes short to deteriorate the separation efficiency. As, in the present embodiment, the mixed liquid circulating passage 531 itself if a zigzag passage of considerable length as described hereinabove so as to maintain the sufficient contact time with respect to the selective transmission membranes 518a, 518b, such a problem as described hereinabove is not caused.

Also, a problem of the liquid temperature fall due to the evaporation latent heat through the progress of the separating operation is not caused at all, because most of the wall face portion of the mixed liquid circulation passage 531 is made of heating fins 523a through 523g of the heating plates 509a, 509b on the side of the warm water circulation chamber 514 for the extremely efficient heating operation.

In the case of the construction of the embodiment, the separation efficiency is better, because the old liquid which has been separated in a certain degree is not mixed with the new liquid which has been newly fed, which is different from the stirring operation of the mixed liquids within the single chamber.

In the description of each embodiment, alcohol mixed liquids containing the water as the feed mixed liquids (feed) are adopted, the water ($H_2O$) is set as separated liquid (permeate) which is an object, but it is needless to say that the object of the liquid separation of the present invention is not restricted to it.

Embodiment 15

Figures 33, 34:
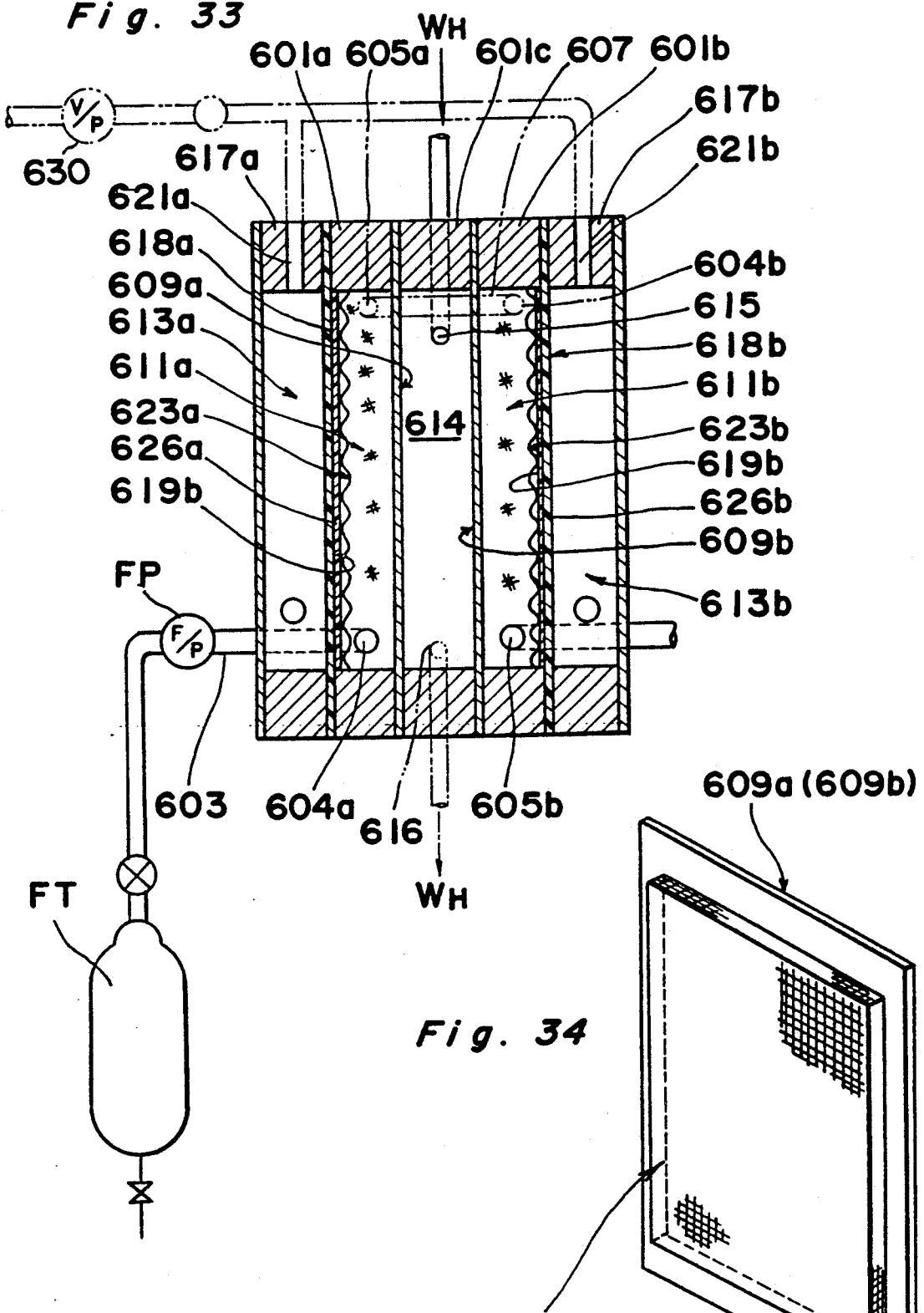
FIG. 33 is a sectional view showing the module construction of the liquid separating apparatus in the embodiment 15 of the present invention.
FIG. 34 is a perspective view of the essential portions of the apparatus of FIG. 33.
Figure 35:
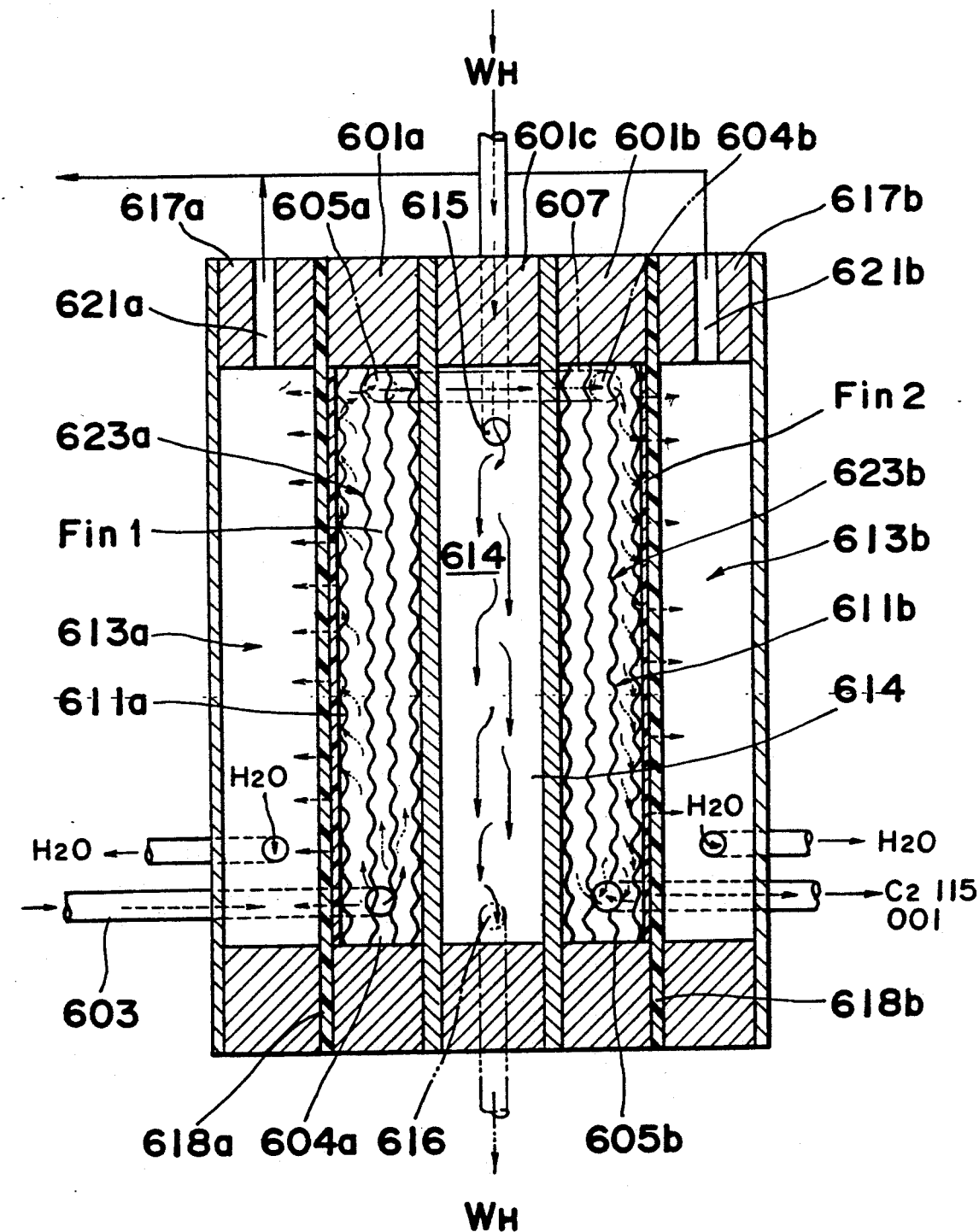
FIG. 35 is a schematic sectional view for illustrating the operation of the construction of the essential portions of the apparatus of FIG. 33.

FIG. 33 through FIG. 35 show the module construction of the liquid separating apparatus of, for example, a plate and frame type in the fifteenth embodiment of the present invention.

The reference characters 601a, 601b in FIG. 33 show the first and second frames of the given width, which are adjacent to each other to form the first and second primary chambers 611a, 611b on the high pressure side for feeding the mixed liquids as shown in FIG. 33. The first mixed liquid feeding opening 604a which is communicated with the feed tank FT through the feed pipe 603 is provided on the first frame 601a, for example, under the front end portion thereof. Also, a first concentration liquid exhaust opening 605a (shown in an imaginary line) for exhausting, for example, concentration alcohol ($C_2H_5OH$) after the water ($H_2O$) which is a separating liquid (permeate) of an object has been permeated, removed is provided above the side of the rear end portion. Also, a second mixed liquid feed opening 604b (shown in an imaginary line) is provided on the second frame 601b, corresponding to the position (on this side in the drawing) of the first concentration liquid exhaust opening 605a of the first frame 601a. The second mixed liquid feed opening 604b is adapted to be connected with the first concentration liquid exhaust opening 605a through a U-shaped coupling pipe. Accordingly, the mixed liquids (feed) Fin1, Fin2 fed from the first mixed liquid feed opening 604a are guided into the second mixed liquid feed opening 604b through the U-shaped coupling pipe 607 from the first concentration liquid exhaust opening 605a after they have received the primary concentration (primary dehydration) treatment through the first primary chamber 611a on the high pressure side as described in, for example, FIG. 35. Thereafter, the mixed liquids are fed as the secondary feed mixed liquid Fin2 into the second primary 611b on the high pressure side. The second concentration liquid exhaust opening 605b is provided in the lower portion on the other end side of the second frame 601b. The feed mixed liquid Fin2 within the second primary chamber 611b on the high pressure side is adapted to be exhausted onto the next treating chamber side from the second concentration liquid exhaust opening 605b.

Reference character 601C is a third frame of the given width fixedly spliced integrally through the first and second heating plates 609a, 609b between the adjacent first and second frames 601a, 601b, with a warm water circulation chamber 614 being formed on the inner side of the third frame 601c. Warm water $W_H$ is fed from the warm water feed opening 615 into the warm water circulation chamber 614, and is exhausted sequentially from the warm water exhaust opening 616, with the warm water within the warm water circulation chamber 614 being adapted to be normally retained in a constant temperature condition. The temperature of the warm water $W_H$ is transmitted through the transmission plates 609a, 609b into each of the mixed liquids Fin1, Fin2 within the first and second primary chambers 611a, 611b on the high pressure side so as to overheat the mixed liquids Fin1, Fin2. In this case, the net members 623a, 623b . . . made of, for example, a metallic material high in heat transfer rate are extended so as to stir the flow of the mixed liquids Fin1, fin2, as shown in FIG. 34, on the contact faces against the mixed liquids Fin1, Fin2 of the heat transfer plates 609a, 609b so as to enlarge the heating area of the heating plates 609a, 609b and also, to form the turbulence through the complicated stirring operation of the mixed liquid flow for forming the turbulence. Also, the net members 623a, 623b are adapted to have the given thickness so as to achieve the function as the spacer between the selective transmission membranes 618a, 618b to be described later in the built up condition of the module.

Reference characters 618a, 618b are selective transmission membranes composed of, for example, water selective amorphous high molecular membrane (described later) which is mounted on the left or right opening face side of the first and second frames 601a, 601b and blockades the space (first and second primary chambers 611a, 611b on the high pressure side) within each frame. The fourth and fifth frames 617a, 617b adjacent onto the outer side of the first, second frames 601a, 601b are integrated with the first and second frames 601a, 601b through the selective transmission membranes 618a, 618b, with first and second secondary chambers 613a, 613b on low pressure side for drawing out the moisture ($H_2O$) through each of the selective transmission membranes 618a, 618b are formed on the inner side thereof. Each of the secondary chambers 613a, 613b on the low pressure is connected with the pressure reducing means 630 such as vacuum pump or the like through the first and second suction openings 621a, 621b. The interior of each of the first and second secondary chambers 613a, 613b on the low pressure side is adapted to be reduced in pressure through the action of the pressure reducing means 630.

Accordingly, according to the liquid separating apparatus using a permeation evaporation method of the construction of the embodiment, the mixed liquids (feed) of water ($H_2O$) and alcohol (ethyl alcohol: C2H5OH) to be continuously fed, introduced into the first primary chamber 611a on the high pressure side from the first mixed liquid feed opening 604a through, for example, the feed pump FP from the feed tank FT flows slowly from the lower side onto the upper side, being mixed, stirred through the net members 623a, 623b within the first primary chamber 611a on the high pressure side for the given time in accordance with the fed thereof and the exhaust speed (see FIG. 35).

In the condition, the side of the first secondary chamber 613a on the low pressure sides is reduced in pressure into an approximate vacuum condition by the operation of the pressure reducing means so as to realize the partial pressure difference more than the given value between the primary chamber side selection molecule adsorption face of the first selective transmission membrane 618a and the secondary chamber side selection molecule disconnection face. The selective transmission membrane 618a in the present embodiment as described hereinabove is formed of a water selective transmission amorphous high molecular membrane (for example, see the specification of Japanese Patent Application No. 62-35401) composed of, for example, "α-fluoro acrylate copolymer" for selectively transmitting only the water ($H_2O$) component as the object. The water component ($H_2O$ molecule) corresponding to the selection characteristics thereof is transmitted from the first primary chamber 611a on the high pressure side into the second secondary chamber 613a on the low pressure side at the transmission speed proportional to the temperature of the mixed liquids themselves, and the concentration difference of the selection component ($H_2O$) between the first primary chamber 611a side on the high pressure side and the first secondary chamber 613a side on the low pressure side.

In this case, in the transmission of the water component ($H_2O$), the water module $H_2O$ in the mixed liquids within the first primary chamber 611a on the high pressure side is absorbed on the selective transmission membrane 618a at first by the material transfer energies accompanied by the concentration difference from the high pressure side onto the low pressure side. Thereafter, the water molecule $H_2O$ is melted, diffused into the separation membrane 618a by the molecular movement accompanied by the resolution action. The melted and diffused amount of the water molecule $H_2O$ at this time largely depends upon the temperature of the mixed liquids, and the partial pressure difference (if the concentration is the same, the material molecule moves from the higher pressure into the lower pressure) between both the boundary faces of the transmission membranes 618a or the concentration difference (when the pressure is equal, the material molecule moves from the higher concentration to the lower concentration) of the selection molecule $H_2O$, or the like. In this case, the partial pressure difference may be comparatively easily controlled into an ideal value by the constant maintenance of the feed pressure through the feed pump FP on the mixed liquid feed side, and also, by the constant maintenance of the reduced value through the pressure reducing means.

But the temperature of the mixed liquids themselves on the side of the primary chamber on the high pressure side and the concentration difference of the selection component ($H_2O$ molecule) may not be easily maintained at a desired value considering the following situation. Namely, as described hereinabove, the transmission action at the selective transmission membrane 618a is a permeation evaporation action, and naturally accompanies phase variation (liquid phase→gaseous phase) of the water component $H_2O$ which is a selection molecule. Thus, as the separation action is advanced, the evaporation latent heat amount is increased to lower the temperature on the mixed liquid side. Such a situation is completely the same even on the side of the second primary chamber 611b on the high pressure side.

But, as described hereinabove, the transmission speed of the water molecule for transmitting through each of the selective transmission membranes 618a, 618b becomes higher when the temperature of the mixed liquids is higher (under the ideal conditions) as clear from the alcohol concentration degree characteristic of FIG. 4, and is superior in transmission performance. Accordingly, in the construction of the present embodiment, the mixed liquids Fin1, Fin2 within the first and second primary chambers 611a, 611b on the high pressure side are adapted to be equally heated and efficiently, raised in temperature from the entrance side thereof onto the exit side thereof through the heating plates 609a, 609b with the net members 623a, 623b being fixedly spliced therewith. Therefore, the temperature fall of the mixed liquids through the evaporation latent heat, especially the reduction in the transmission speed of the water molecule $H_2O$ is compensated for (the ideal temperature conditions of FIG. 4 are maintained).

As the selective transmission membranes 618a, 618b are constructed as water selective one as described already, a continuous layer with the water molecule $H_2O$ component being short is formed inevitably on the side of the adsorption face by the continuous transmission of the water molecule $H_2O$. This is generally called concentration boundary membrane, with a problem that the concentration difference is largely reduced to deteriorate the transmission speed, the transmission efficiency of the water component (see FIG. 5).

However, in the present invention as described hereinabove, the metallic net members 623a, 623b are disposed on the side faces of the first and second primary chambers 611a, 611b side faces on the high pressure side of the heating plates 609a, 609b for heating the feed liquids along the direction along which the mixed liquids flow across the whole region from each of the first, second mixed liquid feed openings 604a, 604b onto the side of the first, second concentration liquid exhaust openings 605a, 605b sides. Accordingly, as shown in the narrow mark (imaginary line) of FIG. 35, the liquid flowing in the direction of the side of each of the concentration liquid exhaust openings 605a, 605b from the side of each of the mixed liquid feeding openings 604a, 604b flows to sequentially from the complicated turbulence to spread right and left, stirring the mixed liquids in each of the projection portions 623a, 623b of the net member so as to destroy, remove the above-described concentration boundary membrane by the stirring operation. As a result, such concentration difference as desired may be maintained, so that the high transmission speed and transmission efficiency of the water component may be realized even in terms of this point.

In the heating plates 609a, 609b in the embodiment, the metallic net members 623a, 623b are integrally spliced with the contact face side against the mixed liquids Fin1, Fin2, and these net members 623a, 623b are used as spacers between the selective transmission membranes 618a, 18b on the other side to improve the heating efficiency and to realize the turbulence forming result by the mixed liquid stirring operation, but protective members 626a, 626b which are made of porous thin membrane and are higher in strength are interposed between the adsorption sides 619a, 619b in the contact relation against the adsorption side faces 619a, 619b of the selective transmission membranes 618a, 619b as the spacers.

Accordingly, the adsorption faces 619a, 619b of the selective transmission membranes 618a, 618b are protected safely by the protective members 626a, 626b. Also, the swelling of the selective transmission membranes 18a, 18b themselves are hard to cause. As the protective members 626a, 626b are formed of the porous thin membrane, the influences are hardly given to the transmission performance itself of the transmission membrane.

The protective members 626a, 626b may use of thin net made of synthetic resin for the porous thin membrane. According to the net made of such synthetic resin, the surfaces of the selective transmission membranes 618a, 618b may be protected from the metallic net members 623a, 623b, and in the adjacent faces of the adsorption surface, there is an advantage in the effective turbulence may be formed through the removing of the concentration boundary membrane.

In the description of the above-described embodiment, alcohol mixed liquids containing the water as the feed mixed liquid (feed) is adopted, the water ($H_2O$) as the separating liquid (permeate) which is an object is set. It is needless to say that the object of the liquid separation of the present invention is not restricted to it.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A liquid separating apparatus comprising a primary chamber on the high pressure side to which the given mixed liquids containing a liquid to be separated and the other liquid are fed, and a secondary chamber on the low pressure side which comes into contact against the primary chamber on the high pressure side through a selective transmission membrane for selectively transmitting the liquid to be separated, a warm water circulation chamber disposed, to which the warm for heating the mixed liquids is fed, outside of and parallel to the primary chamber on the high pressure side, a heat transfer plate for partitioning between the warm water circulation chamber and the primary chamber on the high pressure side whereby a large heat transmission area is provided between the mixed liquids and the circulating warm water and a plurality of projection portions are formed on the face of the heat transfer plate, projecting into the primary chamber on the high pressure side.

2. The liquid separating apparatus as defined in claim 1, wherein a plurality of fins are additionally provided on the projection portions of the heat transfer plate.

3. A liquid separating apparatus comprising a primary chamber on the high pressure side to which the given mixed liquid containing a liquid to be separated and the other liquids, a secondary chamber on the low pressure side which come into contact against the primary chamber on the high pressure side through a selective transmission membrane for selectively transmitting the liquid to be separated, a warm water circulation chamber disposed, to which the warm water for heating the mixed liquids is fed, outside of and parallel to the primary chamber on the high pressure side, a heat transfer plate for partitioning between the warm water circulation chamber and the primary chamber on the high pressure side, the heat transfer plate being formed of a press-moldable metallic plate, and a plurality of fins which are projected by an optional shape and an optional height through the press molding from the primary chamber face on the high pressure side of the heat transfer plate, and are arranged on it regularly or irregularly.

4. The liquid separating apparatus as defined in claim 3, wherein the fins are adapted to achieve a spacer function related to the selective transmission membrane.

5. The liquid separating apparatus as defined in claim 3, wherein said fins are arranged in a given pattern, and also, are brought into opposite contact against the selective transmission membrane through a packing member of the positional pattern corresponding to the pattern of the fins.

6. A liquid separation apparatus comprising a primary chamber on the high pressure side to which the given mixed liquids containing the liquid to be separated and the other liquid are fed, and a secondary chamber on the low pressure side which comes into contact against the primary chambers on the high pressure side through a selective transmission membrane for selectively transmitting the liquid to be separated, a warm water circulation chamber disposed, to which the warm water for heating the mixed liquids is fed, outside of and parallel to the primary chamber on the high pressure side, a heat transfer plate for partitioning between the warm water circulation chamber and the primary chamber on the high pressure side, and a net member of a given thickness fixedly spliced on the face of the heat transfer plate, projecting into the primary chamber on the high pressure side, to achieve a spacer function related to the selective transmission membrane.

7. The liquid separating apparatus as defined in claim 6, wherein the net member is composed of metallic net which has higher heat transfer efficiency.

8. The liquid separating apparatus as defined in claim 6, further comprising a protective member interposed on the selective transmission membrane in contact against the net member within the primary chamber on the high pressure side for protecting the membrane face without the interference with the transmission function.

9. The liquid separating apparatus as defined in claim 8, wherein the protective member is mode of synthetic resin net.

10. The liquid separating apparatus as defined in claim 8, wherein the protective member is made of porous thin membrane.

11. A liquid separating apparatus comprising a primary chamber on a high pressure side to which the given mixed liquids containing a liquid to be separated and the other liquid are fed, a secondary chamber on a low pressure side which comes into contact against the primary chamber through a selective transmission membrane for selectively transmitting the liquid to be separated, a heat means having a shape of a pipe for heating the mixed liquids flowing in the primary chamber from an inlet to an outlet of the primary chamber, thereby to prevent the mixed liquids from underheating by means of the vaporization latent heat, the interior of the primary chamber is partitioned by a plurality of partition walls having tip ends which are alternately projected from mutually opposite inner walls of the primary chamber, and are spaced from the inner walls opposite the respective tip ends to form a series of a flow passages continuous towards the exit side from the entrance side among these partition walls, and also, the heat means for heating the feed mixed liquids is disposed within the flow passages.

12. The liquid separating apparatus as defined in claim 11, wherein a plurality of fins are formed on the outer periphery of the means.

13. The liquid separating apparatus as defined in claim 11, wherein the flow passage is formed between a pair of partition walls formed in a spiral shape towards the central portion from the inner walls in the primary chamber.

* * * * *